(12) United States Patent
Gourlay

(10) Patent No.: US 7,680,038 B1
(45) Date of Patent: Mar. 16, 2010

(54) DYNAMIC BANDWIDTH DETECTION AND RESPONSE FOR ONLINE GAMES

(75) Inventor: Michael J. Gourlay, Orlando, FL (US)

(73) Assignee: Electronic Arts, Inc., Redwood City, CA (US)

( * ) Notice: Subject to any disclaimer, the term of this patent is extended or adjusted under 35 U.S.C. 154(b) by 937 days.

(21) Appl. No.: 11/115,061

(22) Filed: Apr. 25, 2005

(51) Int. Cl.
G01R 31/08 (2006.01)
H04L 12/28 (2006.01)
H04J 3/16 (2006.01)
G06F 15/173 (2006.01)

(52) U.S. Cl. .................. 370/230; 370/252; 370/395.41; 370/468; 709/223

(58) Field of Classification Search ............... 370/238, 370/395.21, 395.41, 508, 519; 709/223–226
See application file for complete search history.

(56) References Cited

U.S. PATENT DOCUMENTS

| 6,315,668 | B1 | 11/2001 | Metke et al. | |
|---|---|---|---|---|
| 6,390,922 | B1 | 5/2002 | Vange et al. | |
| 6,558,258 | B1 | 5/2003 | Rupert et al. | |
| 6,590,869 | B1 * | 7/2003 | Beyda et al. | 370/248 |
| 6,807,173 | B1 * | 10/2004 | Lee et al. | 370/389 |
| 6,930,978 | B2 * | 8/2005 | Sharp et al. | 370/229 |
| 7,463,648 | B1 * | 12/2008 | Eppstein et al. | 370/468 |
| 7,580,972 | B2 * | 8/2009 | Jones et al. | 709/203 |
| 2003/0152096 | A1 * | 8/2003 | Chapman | 370/412 |
| 2003/0221008 | A1 * | 11/2003 | England et al. | 709/226 |
| 2004/0063497 | A1 * | 4/2004 | Gould | 463/42 |
| 2004/0078460 | A1 * | 4/2004 | Valavi et al. | 709/224 |
| 2005/0163059 | A1 * | 7/2005 | Dacosta et al. | 370/252 |
| 2006/0126667 | A1 * | 6/2006 | Smith et al. | 370/486 |
| 2006/0215556 | A1 * | 9/2006 | Wu et al. | 370/230 |
| 2007/0213038 | A1 * | 9/2007 | Masseroni et al. | 455/414.3 |
| 2007/0270135 | A1 * | 11/2007 | Gaschler | 455/414.3 |

OTHER PUBLICATIONS

Postel, J. (1980): "RFC 768: User Datagram Protocol", Internet Engineering Task Force, Aug. 28.

Postel, J. (1981): "RFC 793: Transmission Control Protocol", Internet Engineering Task Force, September.

Jacobson, V (1988): "Congestion avoidance and control", ACM Computer Communication Review; Proceedings of the Sigcomm '88 Symposium in Stanford, CA, August.

Chiu, D-M & Jain, R (1989): "Analysis of the increase and decrease algorithms for congestion avoidance in computer networks", Computer Networks and ISDN Systems, v. 17, pp. 1-14.

(Continued)

*Primary Examiner*—Huy D Vu
*Assistant Examiner*—Brandon Renner
(74) *Attorney, Agent, or Firm*—Philip H. Albert; Townsend and Townsend and Crew, LLP

(57) ABSTRACT

Techniques for optimizing bandwidth usage while controlling latency. A latency mitigating congestion avoidance and control technique is described that is suitable for use with unreliable transport protocols. Embodiments of the present invention facilitate communication of data for applications that communicate using unreliable communication protocols and that would like to maximize use of available bandwidth but cannot tolerate high latencies. Techniques are described for preventing latency from exceeding a certain level, without destroying the ability of an application or system to probe for additional available bandwidth and maximize bandwidth usage.

31 Claims, 9 Drawing Sheets

OTHER PUBLICATIONS

Jain, R (1989): "A delay-based approach for congestion avoidance in interconnected heterogenous computer networks",Digital Equipment Corporation technical report, Apr. 11.

Floyd, S & Jacobsen, V (1993): "Random early detection gateways for congestion avoidance", IEEE/ACM Transactions on Networking, August.

Taylor, D & Morrison, J (1995): "A DIS Variant for Reducing Latency in Long-Haul Networks: Final Report", MaK Technologies, Cambridge, MA.

Gaynor, M (1996): "Proactive packet dropping methods for TCP gateways", Nov. 11.

Padhye, J, Kurose, J, Towlsey, D & Koodli, R (1998): "A TCP-friendly rate adjustment protocol for continuous media flows over best effort networks", Technical Report 98 11, UMASS CMPSCI.

Braden, et al. (1998): "RFC 2309: Recommendations on queue management and congestion avoidance in the internet", Internet Engineering Task Force.

Sisalem, D & Schulzrinne, H (1998): "The loss-delay based adjustment algorithm: a TCP-friendly adaptation scheme", German Ministry of Education and Research.

Cnodder, S.D., Elloumi, O & Pauwels, K (1999): "Effect of different packet sizes on RED performance", Traffic and Routing Technologies project, Antwerp.

Floyd, S & Fall, K (1999): "Promoting the use of end-to-end congestion control in the internet", IEEE/ACM Transactions on Networking, May.

Bansal, D & Balakrishnan, H (2000): "TCP-friendly congestion control for real-time streaming applications", MIT Technical Report MIT-LCS-TR-806, May.

Z.B. Simpson (2000): "A stream-based time synchronization technique for networked computer games," http://www.minecontrol.com/zack/timesvnc/timesvnc.html.

Balakrishnan, H & Seshan, S (2001): "RFC 3124: The congestion manager", Internet Engineering Task Force, June.

Liu, J, B, Zhang, Y-Q (2001): "An end-to-end adaptation protocol for layered video multicast using optimal rate allocation".

Aboobaker, N, Chanady, D & Gerla, M. (2002): "Streaming media congestion control using bandwidth estimation".

Cho, S, Woo, H, Lee, J-w (2002): "ATFRC: Adaptive TCP friendly rate control protocol", Korean Ministry of Education.

Martin, J, Nilsson, A & Rhee, I (2003): "Delay-based congestion avoidance for TCP", IEEE/ACM Transactions on Networking, v. 11, n. 3, June.

Biaz, S & Vaidya, NH (2003): "Is the round-trip time correlated with the number of packets in flight?" IMC'03, Miami Beach, Florida, USA, ACM, OCt. 27-29.

Jun. Yi Lee (2003): "Performance analysis of binomial rate adaptation scheme for TCP-friendly congestion control", students thesis, Department of Computer Science and Information Engineering, National Chung Cheng University, Chia-Yi, Taiwan, Republic of China.

Gourlay; (2004): "Dynamic Bandwidth Detection and Response for Online Games;" 2004; 19 pages; Electronic Arts Knowledge.

* cited by examiner

| Rcvd Seq# | non-contig action | non-contiguous sequence number buffer | | | | NACK action | NACK value |
|---|---|---|---|---|---|---|---|
| S0 | | | | | | | N0 |
| S2 | | S1 implied | S2 | S3 | S4 | | N0 |
| S3 | | S1 implied | S2 | S3 | S4 | | N0 |
| S4 | | S1 implied | S2 | S3 | S4 | | N0 |
| S5 | Reset: | | | | | ++ NACK: | N1 |

*FIG. 5*

| Rcvd Seq# | non-contig action | non-contiguous sequence number buffer | | | | NACK action | NACK value |
|---|---|---|---|---|---|---|---|
| S0 | | | | | | | N0 |
| S2 | | S1 implied | S2 | S3 | S4 | | N0 |
| S4 | | S1 implied | S2 | S3 | S4 | | N0 |
| S1 | Shift left 2: ← ← | S3 implied | S4 | S5 | S6 | | N0 |
| S3 | Reset: | | | | | | N0 |

*FIG. 6*

DYNAMIC BANDWIDTH DETECTION AND RESPONSE FOR ONLINE GAMES

BACKGROUND OF THE INVENTION

The present invention relates to the field of data communication and more particularly to techniques for optimizing bandwidth usage while controlling latency.

Applications such as online video games can produce large amounts of network traffic. Networks however have a limited capacity to convey information, and multiple computers and applications must share that limited resource. For example, networks such as the Internet connect several computers with network links having a limited bandwidth that is shared among the many computers, each of which wants to maximize its usage of available bandwidth. When attempted data rates exceed the network capacity to convey that data, the network congests and the effective network capacity becomes a small fraction of the theoretical capacity, so applications must throttle their usage to remain within available bandwidth.

Two types of protocols are generally used to communicate data between computers in a network environment, namely, reliable protocols and unreliable protocols. When computers transfer data reliably, they use protocols which detect and retransmit the dropped or lost packets. Accordingly, a reliable protocol (also referred to as "reliable transport protocol" or "reliable transport" or "reliable communication protocol") is a type of network transport protocol which generally guarantees delivery, content integrity, and also generally the order of the data packets. When a network link becomes saturated with traffic (i.e., when the actual data rate meets or exceeds capacity), packet buffers fill up and excess packets may get dropped. For example, routers that are used to connect computers and networks together have packet buffers to accommodate small bursts of data packets. If the sustained data rate exceeds the available bandwidth, the router packet buffers get full, latency (i.e., the delay between when a sender sends and a receiver receives a data packet) increases and eventually packets are dropped. This triggers retransmission of the dropped data packets in a reliable protocol. However, if the network is congested, the retransmitted packets often also get dropped. This problem can (and often does) spiral downward into "congestion collapse" in which network links contain mostly retransmission attempts, most of which fail, and the net transfer rate reaches only a tiny fraction of the theoretical capacity of the link.

Several standard solutions are available for congestion avoidance and control for reliable transports. For example, the dominant reliable protocol of the Internet is Transmission Control Protocol (TCP). Several solutions are available for controlling and avoiding congestion for TCP that can be used by applications that use TCP for communications. Examples of such techniques are described in: (1) Floyd, S & Jacobsen, V (1993): "Random early detection gateways for congestion avoidance", IEEE/ACM Transactions on Networking, August; and (2) Postel, J. (1981): "RFC 793: Transmission Control Protocol", Internet Engineering Task Force, September.

In addition to reliable transport data (e.g., TCP data), the communication networks such as the Internet also carry traffic using unreliable transports (also referred to as "unreliable transport protocol" or "unreliable transport" or "unreliable communication protocol") which do not guarantee delivery or order of the data packets. Some guarantee content integrity. Examples of such unreliable traffic include online game data and streaming audio and video data which make high demands on available network bandwidth. The User Datagram Protocol (UDP) (RFC 768) is the dominant "best effort" or unreliable protocol used on the Internet. Such unreliable communication protocols have no systematic, ubiquitous or standard congestion control system, partly because each application has specialized requirements. For example, online interactive games require keeping latency as low as possible, whereas the performance of most other applications suffers little or no negative consequences as latency increases.

Without congestion control, these unreliable data streams can saturate network links and defeat or unfairly compete with the congestion avoidance systems in TCP. Typically, these streams implicitly compete for bandwidth with unfair or unfriendly behaviors. Applications which do not detect and respond to changes in available bandwidth (the network link data rate capacity minus potential usage by other connections that share the same physical link) typically make assumptions about available bandwidth, and those assumptions can be either too small or too large, potentially resulting in inadequate performance, excessive packet loss and can interfere with protocols that perform congestion control (See: Floyd, S & Jacobsen, V (1993): "Random early detection gateways for congestion avoidance", IEEE/ACM Transactions on Networking, August.).

Some nascent congestion control systems exist for unreliable traffic protocols as described in: (1) Padhye, J, Kurose, J, Towsley, D & Koodli, R (1998): "A TCP-friendly rate adjustment protocol for continuous media flows over best effort networks", Technical Report 98 11, UMASS CMPSCI; (2) Sisalem, D & Schulzrinne, H (1998): "The loss-delay based adjustment algorithm: a TCP-friendly adaptation scheme", German Ministry of Education and Research; (3) Jun Yi Lee (2003): "Performance analysis of binomial rate adaptation scheme for TCP-friendly congestion control", student thesis, Department of Computer Science and Information Engineering, National Chung Cheng University, Chia-Yi, Taiwan, Republic of China; (4) Balakrishnan, H & Seshan, S (2001): "RFC 3124: The congestion manager", Internet Engineering Task Force, June; (5) Liu, J, Li, B, Zhang, Y-Q (2001): "An end-to-end adaptation protocol for layered video multicast using optimal rate allocation"; and (6) Aboobaker, N, Chanady, D & Gerla, M. (2002): "Streaming media congestion control using bandwidth estimation". However, most of these are aimed to work with streaming media, which typically has low sensitivity to large latencies. These techniques are inadequate for interactive media applications such as online games that are very sensitive to latencies.

Accordingly, conventional systems do not provide an adequate solution for achieving high bandwidth usage with low latency using unreliable protocols.

BRIEF SUMMARY OF THE INVENTION

Embodiments of the present invention provide techniques for optimizing bandwidth usage while controlling latency. A latency mitigating congestion avoidance and control technique is described that is suitable for use with unreliable transport protocols. Embodiments of the present invention facilitate communication of data for applications that communicate using unreliable communication protocols and that would like to maximize use of available bandwidth but cannot tolerate high latencies. Techniques are described for preventing latency from exceeding a certain level, without destroying the ability of an application or system to probe for additional available bandwidth and maximize bandwidth usage.

According to an embodiment of the present invention, techniques are provided for communicating data from a sender system to a receiver system via a network connection. Data is communicated from the sender system to the receiver system in a first mode, wherein communicating the data in the first mode comprises: (a) determining an available bandwidth estimate for the network connection; (b) determining a bandwidth target that is a fraction of the available bandwidth estimate; (c) communicating data to from the sender system via the network connection using an unreliable protocol at a data rate that is substantially equal to the bandwidth target; (d) monitoring latency associated with the network connection; repeating (a), (b), (c), and (d) until a condition for exiting the first mode is satisfied; and computing a latency threshold ($latency_{threshold}$) for the network connection and exiting the first mode upon determining that the condition for exiting the first mode is satisfied. Data is communicated from the sender system to the receiver system in a second mode, wherein communicating the data in the second mode comprises: (e) determining an available bandwidth estimate for the network connection; (f) determining a bandwidth target that is substantially equal to the available bandwidth estimate; (g) communicating data from the sender system via the network connection using an unreliable protocol at a data rate that is substantially equal to or greater than the bandwidth target; (h) monitoring latency associated with the network connection; repeating (e), (f), (g), and (h) until a condition for exiting the second mode is satisfied; and exiting the first mode upon determining that the condition for exiting the second mode is satisfied. Data is communicated by alternating between the first mode and the second mode.

According to an embodiment of the present invention, the data that is communicated is generated by an online game application hosted by the sender system and the receiver system is a data processing system receiving data from the online game application.

According to an embodiment of the present invention, the unreliable protocol used for communicating data in the first mode and in the second mode is User Datagram Protocol (UDP).

According to an embodiment of the present invention, the condition for exiting the first mode is satisfied when the latency associated with the network connection is less than a first latency value, wherein the first latency value is based upon a latency tolerance of an application generating the data being communicated. According to another embodiment of the present invention, the condition for exiting the first mode is satisfied when the latency associated with the network connection is less than a first latency value and a time duration for the first mode has expired, wherein the first latency value is based upon a latency tolerance of an application generating the data being communicated.

According to an embodiment of the present invention, the condition for exiting the second mode is satisfied when the latency associated with the network connection is greater than the latency threshold ($latency_{threshold}$) computed for the network connection during the first mode or a time duration for the second mode has expired.

According to an embodiment of the present invention, techniques are provided for communicating data from a sender system via a plurality of network connections using an unreliable protocol. Data is communicated from the sender system over the plurality of connections in a first mode, wherein communicating the data in the first mode comprises: (a) determining an available bandwidth estimate for each network connection in the plurality of network connections; (b) determining, for each network connection in the plurality of network connections, a bandwidth target that is a fraction of the available bandwidth estimate for the network connection; (c) communicating, for each network connection in the plurality of network connections, data via the network connection using an unreliable protocol at a data rate that is substantially equal to the bandwidth target determined for the network connection; (d) monitoring latency associated with the plurality of network connections; repeating (a), (b), (c), and (d) until a condition for exiting the first mode is satisfied; and computing a latency threshold ($latency_{threshold}$) for each network connection in the plurality of network connections and exiting the first mode upon determining that the condition for exiting the first mode is satisfied. Data is communicated from the sender system over the plurality of network connections in a second mode, wherein communicating the data in the second mode comprises: (e) determining an available bandwidth estimate for each network connection in the plurality of network connections; (f) determining a penalty for at least one network connection from the plurality of network connections; (g) determining a bandwidth target for the at least one network connection based upon the available bandwidth estimate and the penalty determined for the at least one network connection; (h) communicating data via the at least one network connection using an unreliable protocol at a data rate that is substantially equal to or greater than the bandwidth target determined for the at least one network connection; (i) monitoring latency associated with the at least one network connection; repeating (e), (f), (g), (h), and (i) until a condition for exiting the second mode is satisfied; and exiting the second mode upon determining that a condition for exiting the second mode is satisfied. Data communication is alternated between the first mode and the second mode.

According to an embodiment of the present invention, the penalty is determined based upon a latency tolerance of an application generating the data being communicated, and the latency associated with the at least one network connection.

According to an embodiment of the present invention, determining a bandwidth target for the at least one network connection in the second mode comprises: (a) if the latency associated with the network connection is greater than a first latency, then setting the bandwidth target based upon the available bandwidth estimate determined for the at least one network connection in the second mode, a first constant, and the penalty determined for the at least one connection, wherein the first latency value is based upon a latency tolerance of an application generating the data being communicated; (b) if the latency associated with the at least one network connection is greater than the latency threshold computed for the at least one network connection during the first mode, then setting the bandwidth target for the at least one network connection based upon the available bandwidth estimate determined for the at least one network connection in the second mode, a second constant, and the penalty determined for the at least one network connection, where the second constant is calculated based upon the first constant; and (c) if the latency associated with the at least one network connection is less than or equal to the latency threshold computed for the at least one network connection during the first mode, then setting the bandwidth target for the at least one network connection to the available bandwidth estimate determined for the at least one network connection in the second mode.

According to an embodiment of the present invention, the condition for exiting the first mode is satisfied when, in the first mode, the latency associated with a network connection from the plurality of network connections having the lowest associated latency is less than a first threshold latency value, the first threshold latency value determined based upon a latency tolerance of an application generating the data being communicated. According to another embodiment of the present invention, the condition for exiting the first mode is satisfied when, in the first mode, the latency associated with a network connection from the plurality of network connections having the lowest associated latency is less than a first threshold latency value and a time duration for the first mode has expired, the first threshold latency value determined based upon a latency tolerance of an application generating the data being communicated.

According to an embodiment of the present invention, the condition for exiting the second mode is satisfied when, in the second mode, the latency associated with the network connection in the second mode is greater than a first threshold latency value, or a time duration for the first mode has expired, or the latency associated with each network connection in the plurality of network connections is greater than the latency threshold (latency$_{threshold}$) computed for the network connection during the first mode.

According to an embodiment of the present invention, techniques are provided for communicating data. Data is communicated in a first mode over a network connection using an unreliable protocol at a data rate that is a fraction of an available bandwidth estimate for the network connection until a condition for exiting the first mode is satisfied, wherein a latency threshold (latency$_{threshold}$) is computed for the network connection when the first condition is satisfied. Data is communicated in a second mode over the network connection using an unreliable protocol at a data rate that is substantially equal to an available bandwidth determined for the network connection until a condition for exiting the second mode is satisfied. Data communication is alternated between the first communication mode and the second communication mode.

According to an embodiment of the present invention, the condition for exiting the first mode is satisfied when the latency associated with the network connection is less than a first latency value, wherein the first latency value is based upon a latency tolerance of the application, and the condition for exiting the second mode is satisfied when the latency associated with the network connection is greater than the latency threshold (latency$_{threshold}$) computed for the network connection or a time duration for the second mode has expired.

According to an embodiment of the present invention, the available bandwidth estimate for a network connection is increased during the second mode.

The foregoing, together with other features, embodiments, and advantages of the present invention, will become more apparent when referring to the following specification, claims, and accompanying drawings.

BRIEF DESCRIPTION OF THE DRAWINGS

FIG. 5 depicts a scenario for reordering of data packets according to an embodiment of the present invention;

FIG. 6 depicts another scenario for reordering of data packets according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for optimizing bandwidth usage while controlling latency. A latency mitigating congestion avoidance and control technique is described that is suitable for use with unreliable transports. Embodiments of the present invention facilitate communication of data for applications that communicate using unreliable communication protocols and that would like to maximize use of available bandwidth but cannot tolerate high latencies. Examples of such applications include real-time interactive online games. Techniques are described for preventing latency from exceeding a certain level, without destroying the ability of the system to probe for additional available bandwidth and maximize bandwidth usage.

The teachings of the present invention are applicable to any data communication environment wherein applications strive for increased bandwidth but where low latencies are preferred. An example of such an application is online gaming. Accordingly, an embodiment of the present invention has been described below with reference to online gaming. It should however be apparent that application of the present invention is not limited to online gaming.

Figure 1:
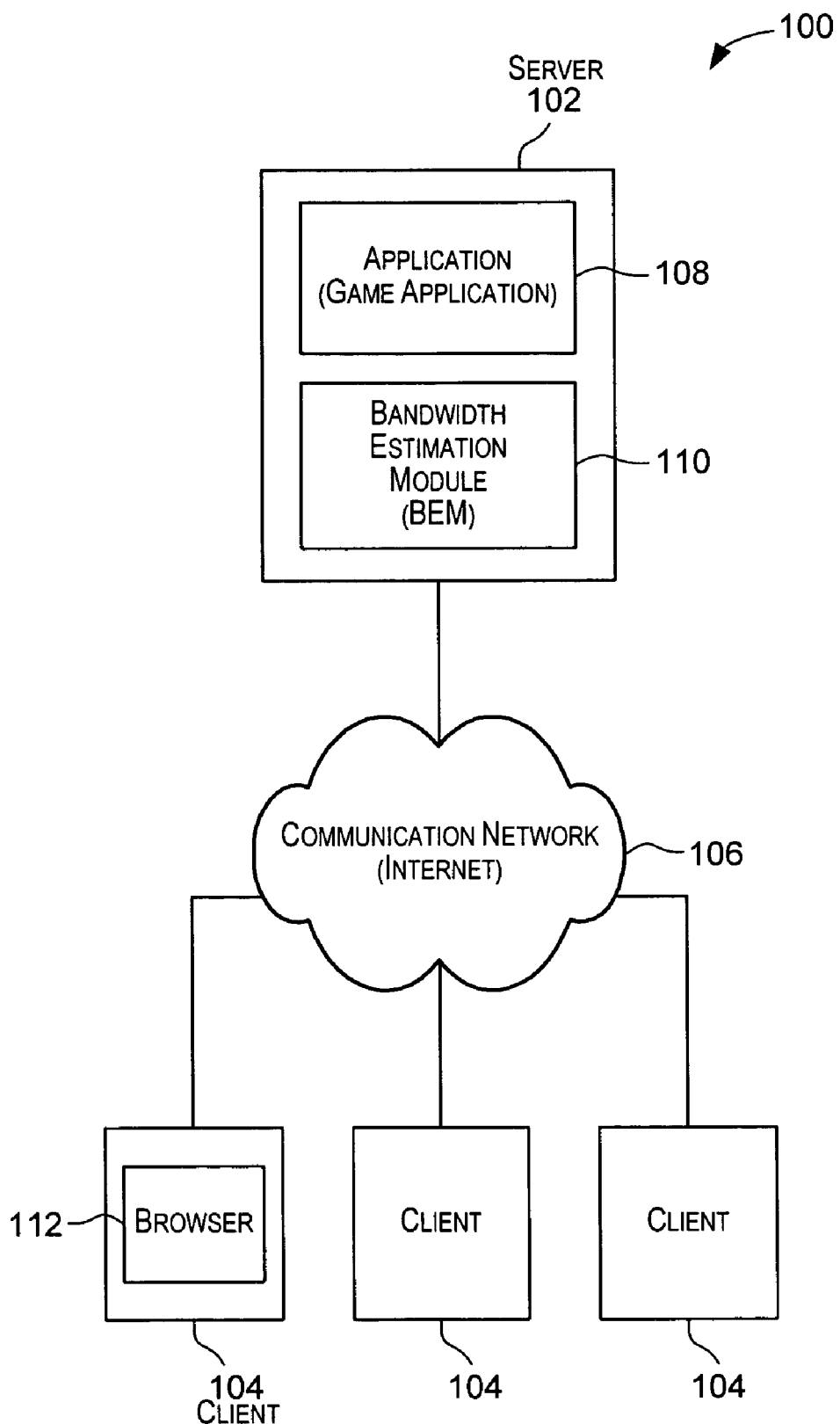
FIG. 1 depicts a simplified online multi-player gaming environment in accordance with an embodiment of the present invention.

FIG. 1 depicts a simplified online multi-player gaming environment 100 in accordance with an embodiment of the present invention. Online gaming environment 100 comprises a server 102 in communication with a number of clients 104 via communication network 106. Server 102 and clients 104 may be connected to communication network 106 via communication links. FIG. 1 is merely illustrative of an embodiment incorporating the present invention and does not limit the scope of the invention as recited in the claims. One of ordinary skill in the art would recognize other variations, modifications, and alternatives.

Communication network 106 may be a local area network (LAN), a wide area network (WAN), a wireless network, an Intranet, the Internet, a private network, a public network, a switched network, or any other suitable communication network. Communication network 106 may comprise many interconnected computer systems and devices (e.g., routers)

and communication links. Various communication protocols may be used to facilitate communication of information via communication network 104, including reliable communication protocols (e.g., TCP) and unreliable communication protocols (e.g., UDP), and others. In a particular online gaming environment, communication network 106 is the Internet, as depicted in FIG. 1.

The communication links coupling server 102 and clients 104 to communication network 106 and the communication links of network 106 may be of various types including hardwire links, optical links, satellite or other wireless communications links, wave propagation links, or any other mechanisms for communication of information.

Server 102 executes an application program 108 that provides data from server 102 to clients 104. In the embodiment depicted in FIG. 1, server 102 executes a game application 108 and provides real time multiplayer online game services to clients 104. One or more users of clients 104 can participate in the online gaming services provided by server 102. Although FIG. 1 depicts game application 108 as being executed by server 102, in alternate networked environments, the game application or portions thereof may also be executed by clients 104 or by some other computers in the network environment.

Clients 104 may be located at different locations. Users of clients 104 may engage in real time online interactive game play with other users. The services and processing for the online game play may be provided by server 102. In a typical online game, multiple clients 102 may be connected to server 102 and participate in online gaming services provided by server 102.

Client system 104 may be a desktop personal computer, workstation, laptop, personal data assistant (PDA), a wireless communication device (e.g., a cellular phone), a game console such as a Sony Playstation2™, Microsoft X-Box™, Nintendo GameCube™, etc., or any other suitable computing device or platform that is capable of participating in gaming services provided by server 102. A client system 104 may interface with server 102 either directly or indirectly via communication network 106 (as shown in FIG. 1). A client system 104 typically runs a program that allows users of the client system to access, process, and view information provided by server 102 or by other systems over Internet 106. Examples of such programs include browsers (e.g., Microsoft's Internet Explorer, Netscape Navigator), user interface programs, game interfaces, and others. As previously indicated, in some embodiments, a client system 104 may also execute a portion of game application 108 or some module that communicates with server 102 and enables a user of the client system to participate in interactive online games.

Client system 104 also typically includes input and output devices. Input devices enable a user to interact with client system 104 and may include a keyboard, a mouse, a touch screen, a pen or other pointing device, a joystick, various game controllers (e.g., controllers for various game consoles, a steering wheel, a gas pedal, etc.), and the like. A user of a client system may use one or more of the input devices to interact with online games provided by game application 108 and hosted by server 102. Output devices may include a monitor, a speaker for audio feedback, and the like. Video, audio, images and other types of information provided by the online game may be output to the user using one or more of the output devices.

As part of providing an online interactive gaming experience for single players (single player mode) or for multiple players (multi-player mode), game application 108 generates large amounts of data that is communicated from server 102 to clients 104. The data may be communicated from server 102 to clients 104 over one or more network connections. As part of online gaming, server 102 may also receive data from client systems 104. However, in a typical online game, the data communicated from server 102 to a client 104 far exceeds the data communicated from a client system 104 to a server 102. In the context of an online game, a client 104 may also exchange information with other clients. However, in a typical online gaming application, inter-client communication is mediated by the server (i.e., a client system sends information to a server which then communicates the information to the intended destination client).

Server 102 may communicate with clients 104 using a reliable transport protocol (e.g., TCP) or an unreliable transport protocol (e.g., UDP). A reliable protocol is a type of network transport protocol which generally guarantees delivery, content integrity, and also generally the order of the data packets. An unreliable protocol is one that does not guarantee delivery or order of the data packets but may guarantee content integrity. The protocol overhead and bandwidth usage required by reliable transport protocols (e.g., TCP) make them undesirable for use in applications such as online games that desire maximized bandwidth usage. Accordingly, online gaming applications generally use unreliable communication protocols such as UDP for data communications to maximize the throughput of the communication. For purposes of describing the present invention, it is assumed that in the context of online gaming server 102 communicates with clients 104 using an unreliable protocol.

As previously described in the Background section, unreliable communication protocols have no systematic, ubiquitous or standard congestion control system. Further, the few congestion control schemes that are available for unreliable protocols introduce large latencies and thus are not suitable for interactive media applications such as online games that are very sensitive to latencies. For example, consider a racing game such as NASCAR 2005: Chase for the CUP™ (hereinafter referred to as "N05CFTC") provided by Electronic Arts, Inc. of Redwood City, Calif. N05CFTC is a high-speed racing game with several (e.g., up to 4 in one version of N05CFTC) racers in nearly identically performing cars which can be played online simultaneously by multiple players. In order to remain synchronized with each other, game participants often have to exchange telemetry data, so the game has the potential to consume large amounts of network bandwidth. Due to differing ranges of Internet connections available to client systems used by the online users ranging from modems to local area networks, N05CFTC has to be able to operate over network connections as slow as 32 kilobits per second (or even slower), or as fast as 100 megabits per second (or faster). Furthermore, since the available bandwidth over these connections can fluctuate over the course of a game, the game application has to be able to detect and respond to such fluctuations. The game can tolerate losing a considerable number of packets, so it can use an unreliable protocol and avoid the overhead associated with reliable protocols (overhead includes not just additional data but also delays observed by the application due to the lower level protocol correctly ordering packets due to packet loss or packet reordering in reliable protocols). Each game participant receives telemetry data from remote participants after some latency, therefore requiring speculative prediction of remote entity state (position, velocity, orientation, etc.), so latency dramatically affects the performance of the game. Consequently, even though the game application would like to maximize use of available bandwidth, it also needs to keep latency low to make online game play viable. Accordingly, online N05CFTC game play requires detecting available bandwidth, making optimal use of that resource, all under the constraint of keeping latency low.

In accordance with the teachings of the present invention, server 102 is configured to detect available bandwidth for unreliable protocols, make optimal use of the available bandwidth, all under the constraint of keeping latency low. As depicted in FIG. 1, server 102 provides a bandwidth estimation module (BEM) 110 that is configured to, for each connection using an unreliable protocol, determine the available bandwidth for the connection, probe the network connection for additional bandwidth, monitor latencies associated with the communication for each connection, and in general perform functions that enable optimized usage of bandwidth over the connection while keeping latencies low and within tolerable limits. BEM 110 may perform these functions in conjunction with application 108 and/or other modules (not shown in FIG. 1) of server 102. BEM 110 may be implemented as a software module (or code or instructions) executed by server 102, as a hardware module, or a combination of software and hardware.

BEM 110 may be provided on any system that communicates data, i.e., on any system that sends data (referred to as a "sender" or "sender system") using an unreliable protocol. For example, when server 102 communicates data to a client system, server 102 is the sender system and may avail itself of the functions provided by BEM 110. Although not shown in FIG. 1, a BEM 110 may also be present on client 104 and facilitate transmission of data from the client using an unreliable protocol. Accordingly, in general, any data communication sender system that communicates data using an unreliable protocol may use the services and functions provided by BEM 110.

For the remainder of this application, the term "sender" or "sender system" is used to refer to a system that communicates or sends data to another system. The data may be provided by an application executing on the sender system. The term "receiver" or "receiver system" is used to refer to any system that receives data from a sender system.

Maximizing Bandwidth Usage

Figure 2:
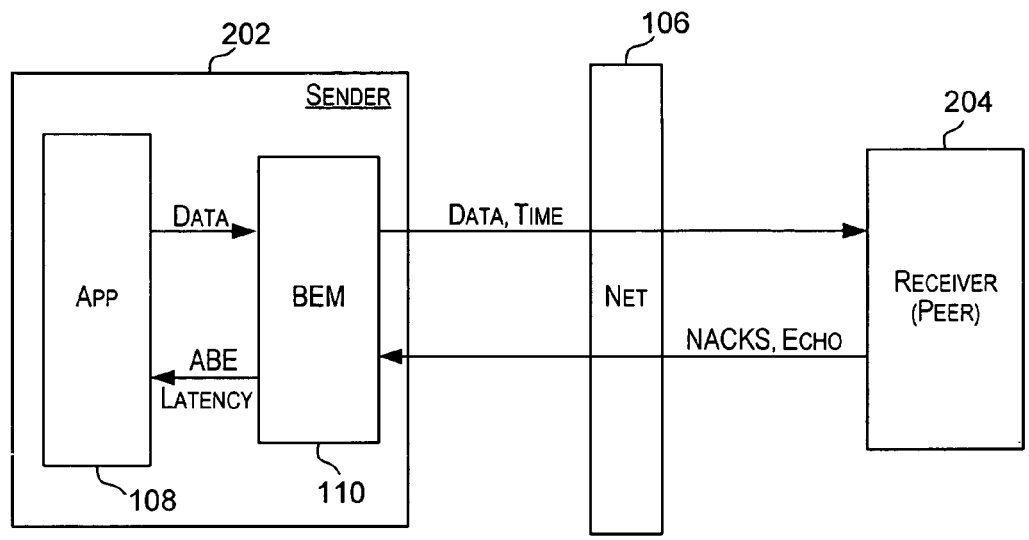
FIG. 2 depicts a system configured to provide congestion control for an unreliable protocol (such as UDP) according to an embodiment of the present invention.

FIG. 2 depicts a system configured to provide congestion control for an unreliable protocol (such as UDP) according to an embodiment of the present invention. The system depicted in FIG. 2 comprises a sender system 202 (which may be server 102) executing an application 108 (which may be an online game application) that communicates data to a receiver system 204 (which may be a client 104) over a network 106 using an unreliable protocol. For sake of simplicity, it is assumed in FIG. 2 that sender 202 communicates with a single receiver 204 via a network connection. It should be understood that in alternative embodiments, sender 202 may communicate with multiple receivers using multiple connections. The network connection used by sender 202 to communicate data from application 108 to receiver 204 may comprise a single link or multiple links and may involve (and typically does) involve hops through routers. The network connection may traverse over one or more networks such as the Internet. In FIG. 2, arrows represent direction of data communication over the network connection link.

Unreliable protocols such as UDP provide no acknowledgements, at the protocol layer, and as a result network peers receive no information about dropped packets. As a result, according to an embodiment of the present invention, for applications (such as online games) intent upon detecting and using available bandwidth using an unreliable protocol, a congestion avoidance technique is implemented at the application layer. In the embodiment depicted in FIG. 2, the congestion avoidance technique may be performed by BEM 110 and application 108 in conjunction. In some embodiments, BEM 110 may be incorporated as part of application 108. The congestion control technique depicted in FIG. 2 and described below provides techniques for detecting lost (or dropped) data packets in communications using an unreliable protocol and techniques for conveying that information back to sender 202. Application 108 executing on sender 202 is configured to use the information received from receiver 204 to detect congestion conditions and to throttle the communication data rate. In the embodiment depicted in FIG. 2 and described below, to avoid data congestion on unreliable transports, peers provide redundant feedback about packet loss in the form of messages (referred to as NACK messages).

Application 108 is configured to initiate data communication by sending data packets to receiver 204 via a network connection at a particular initial data rate. In one embodiment, the initial data rate at which application 108 sends the data packets may be user configurable. In another embodiment, BEM 110 is configured to provide an initial available bandwidth estimation (ABE) value to application 108. The ABE is an estimation of the available bandwidth for the connection. Application 108 is configured to communicate data packets at a data rate that is substantially equal to the ABE or greater than the ABE. For example, BEM 110 may expose a function that provides an initial estimate value for the available bandwidth.

In one embodiment, a preliminary probe may be used to acquire information about available bandwidth estimate which is used to set the initial data rate. The information may come from a number of sources including vendor-supplied Quality-of-Service data (e.g., Microsoft QoS), hard-coded information specific to the network connections, an application-supplied rough initial estimate, a rapid probe that floods the network with data and measures throughput, or any other source. In other embodiments, "Multiplicative Increase, Multiplicative Decrease" (MIMD) control algorithm based techniques may also be used to start the communication.

According to one implementation for the N05CFTC game, a preliminary network bandwidth probe is used in the first few seconds after all game clients connect to the game host. When the preliminary probe operates, BEM 110 has an opportunity to raise the ABE value from its initial, very small number, to something more reasonable. This allows the game to initiate with a reasonable data rate, which improves game play at early stages of online games, which, for N05CFTC, are very taxing because of the close proximity of large numbers of vehicles.

BEM 110 is configured to keep track of the communication data rate of application 108. In the embodiment depicted in FIG. 2, application 108 provides the data packets to BEM 110 which then communicates the data packets to the receiver over a network connection. In should be understood that this is not intended to limit the scope of the present invention. In alternative embodiments, application 108 may communicate the data directly or use the services of one or more other modules (e.g., specialized communication modules) to communicate data to the receiver.

Receiver 204 is configured to send information back to sender 202 that is used by the sender to detect network congestion. According to an embodiment of the present invention, the information sent from the receiver to the sender is in the form of messages (referred to as "NACK messages"). Receiver 204 is configured to send a NACK message to sender 202 for every data packet received by the receiver from sender 202. Each NACK message includes a sequence number or value (also referred to as the NACK value). Receiver 204 is configured to send NACK messages with the same value as long as receiver 202 does not detect a loss of data packet communicated from sender 202. When receiver 204 detects a loss of data packet event, it sends a NACK message with a changed serial number (NACK value is incremented or decremented). In this manner, a NACK with a changed value received by the sender from the receiver indicates that the receiver has detected a loss of a data packet.

BEM 110 is configured to track receipt of NACK messages from receiver 204. As long as the NACK messages do not indicate a loss of data packet event, BEM 110 is configured to ramp up or increase the value of ABE and provide the increased ABE to application 108. Application 108 is then configured to communicate data packets at a data rate that is substantially equal to the increased ABE or greater than the ABE. This ramping up of the data rate based upon the ABE provided by BEM 110 enables application 108 to probe for additional available bandwidth on the network connection and to maximize use of that bandwidth.

When BEM 110 receives a NACK message from the receiver with a changed NACK value, thereby indicating a lost or dropped data packet, BEM 110 is configured to decrease the value of the ABE and provide the decreased ABE to application 108. Application 108 is then configured to communicate data packets over the connection at a data rate corresponding to the decreased ABE. In this manner, by reducing the data rate, a chance is provided for the network routers to clear their buffers and to reduce the potential of another lost or dropped data packet.

In one embodiment of the present invention, BEM 110 may be configured to operate on a time scale called a "heartbeat" (or time interval), which lasts for a specific duration of time. The heartbeat interval may be constant or dynamic. The communication technique for communicating data for a network connection is as follows:

For each heartbeat,
    If a loss of data packet event is detected, then
    Decrease ABE
    Communicate data at a data rate substantially equal to or above the ABE
    Else
    Increase the ABE
    Communicate data at a data rate substantially equal to or above the ABE In this manner BEM 110 is configured to calculate the ABE for a network connection.

In some situations, the network may be so congestion that the NACK messages are dropped and fail to reach the sender. To accommodate such situation, a lack of received data (NACK messages) by the sender from the receiver over the duration of a heartbeat may also imply a packet loss event. This protects against a situation where the network is so congested that no NACK packets arrive.

As indicated above, the heartbeat time interval may be constant or dynamic. In one embodiment, for a version of the N05CFTC game, a constant heartbeat value of 500 milliseconds was used. A constant value was used partly because the game has a narrow tolerance for latencies (latencies >250 milliseconds make the game unplayable) and a constant value simplified the communication algorithm. In alternative embodiments, a dynamic heartbeat value may also be used. For example, the increase and decrease intervals may be set to equal <RTT> (round trip time) and <RTT>+4$\sigma_{RTT}$. Round-trip time (RTT) is the time it takes for a packet to go from sender to receiver, and its response to return to the initial sender. The measure of "latency" is one-way, and generally inferred from the round-trip-time. Typically, latency=round-trip-time/2. The angle brackets "< >" indicate the average over time. The $\sigma_{RTT}$ refers to the standard deviation of that average. The increase interval would be <RTT> because that is the typical amount of time that information can make a round trip. The <RTT>+4$\sigma_{RTT}$ is used as the "timeout" value, i.e., the duration after which the server not hearing a response infers that the lack of response is tantamount to a NACK. The 4$\sigma_{RTT}$ simply allows for some fluctuation in the round-trip-time. Using a dynamic value may allow the communication system to converge more rapidly to the equilibrium ABE (since RTT is usually much less than 500 milliseconds), and for applications which can tolerate very high latencies (>500 ms) this system would function properly.

Figure 3:
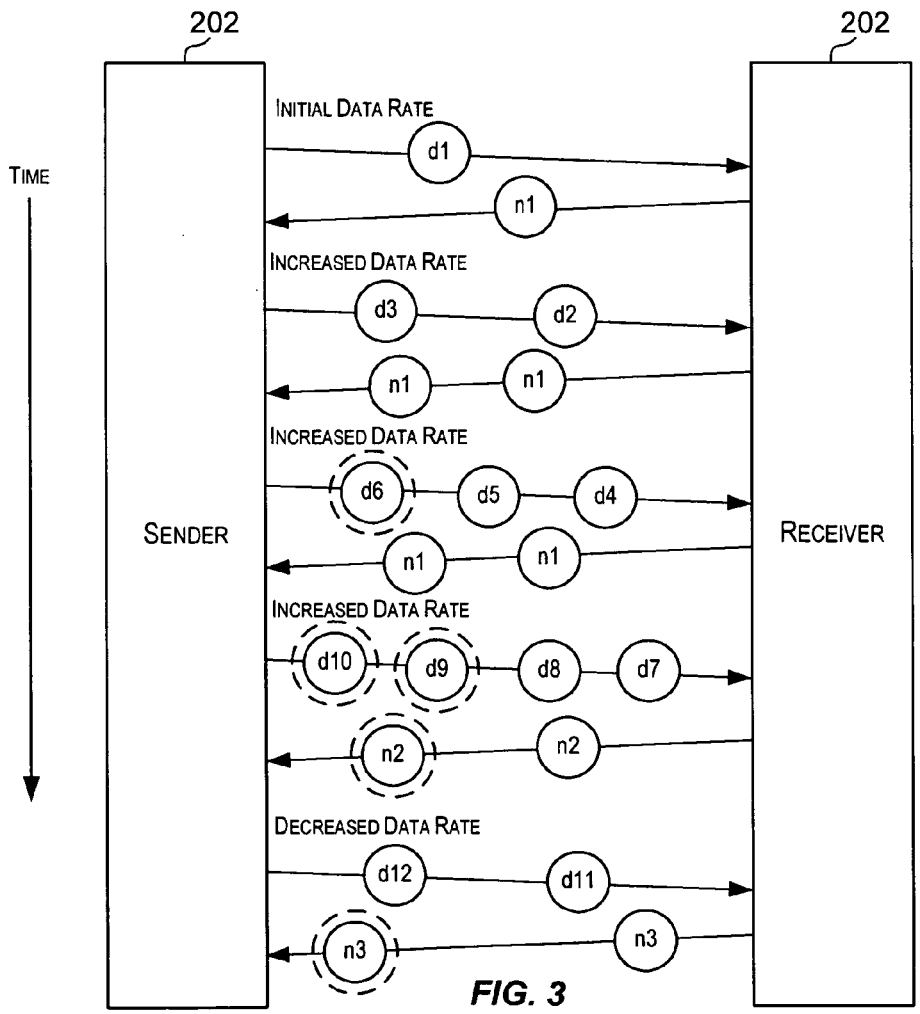
FIG. 3 depicts communication of data packets and NACKS between a sender and a receiver over a period of time according to an embodiment of the present invention.

The NACK-based communication protocol for detecting network congestion using an unreliable protocol may be explained with respect to FIG. 3. FIG. 3 depicts communication of data packets and NACKS between sender 202 and receiver 204 over a period of time. In FIG. 3 arrows represent direction of communication. Round nodes are used to represent packets, including data packets and NACK messages, communicated between sender 202 and receiver 204. Round nodes with prefix "d" indicate data packets sent from sender 202 to receiver 204. Numbers associated with data packets indicate the sequence of the data packets. Round nodes with prefix "n" denote NACK messages sent from receiver 204 to sender 202. The embodiment depicted in FIG. 3 assumes that receiver 204 does not tolerate any reordering of data packets before indicating a loss of data packet event. In alternative embodiments, receiver 204 may be configured to look for non-contiguous packets and may tolerate some reordering (described below in more detail) before indicating a lost or dropped packet by sending a NACK with a changed serial number.

As depicted in FIG. 3, a single data packet "d1" is initially sent from sender 202 to receiver 204. Sender 202 receives a NACK "n1" (i.e., having value 1) corresponding to data packet d1. Since there was no loss of the data packet event, the ABE is increased and as a result application 108 sends data at an increases data rate, as denoted by sending a burst of two data packets d2 and d3. The data rate is increased until a NACK message indicates a loss of data packet event. In FIG. 3, receiver 204 detects a loss of a data packet when it receives d7 after d5, thereby indicating a loss of data packet d6 (lost data packet is emphasized in FIG. 3 with a dotted circle surrounding the data packet). Upon detecting a data packet loss, receiver 204 changes the NACK value (changed from n1 to n2) and communicates the NACK message with the changed NACK value to sender 202 (in FIG. 3, the NACK message with the changed NACK value is emphasized with a dotted circle surrounding the NACK message). Upon receiving the NACK message with the changed value indicating a loss of data packet event, the sender decreases the ABE for the next data burst and as a result the data rate of the application is also decreased (as indicated by sending only two data packets d11 and d12 during the next communication burst). As shown in FIG. 2, data packets d9 and d10 are also dropped. This data loss is indicated to the sender by sending a NACK with a value of n3 (NACK value changed from n2 to n3).

As described above, NACK messages accompany all data packets, and NACK values only change when a receiver detects a lost or dropped packet. The redundancy of NACK messages mitigates the chances that lost NACK messages will fail to inform the sender about packet loss. As long as at least one NACK message arrives at the sender, the sender will know one or more data packets got lost. To protect against severe congestion in which all NACK messages get dropped, senders may also treat an enduring lack of incoming packets as tantamount to a packet loss, and therefore reduce the ABE which in turn causes reduction in the data transfer rate from the sender to the receiver. Since this communication is performed using an unreliable protocol there is no retransmission of the lost data packet. Further, the NACK message does not identify which data packet was lost, it only indicates that at least one data packet was lost.

According to an embodiment of the present invention, packets exchanged between the sender and the receiver comprise auxiliary information that facilitates the implementation of the NACK-based congestion control scheme for an unreliable protocol. A network wrapper module may automatically append auxiliary information to each datagram the application sends. The auxiliary information in one embodiment may include the following fields:

Sequence number (received by sender from receiver)
NACK value (received by sender from receiver)
NACK bandwidth (received by sender from receiver)
Timestamp (received by receiver from sender)
Timestamp echo (received by sender from receiver)

In a NACK-based system, the returned NACK value is a serial number instead of an echo of received sequence numbers, and as a result the sequence number range used for the NACK messages could be very small, e.g., 8 bits. Having a very small number of bits may increase the probability that two sequence numbers could appear to be unchanged when they are not. For example, if the possible NACK values were $\{0, 1, 2, 3\}$ then losing an integer multiple of 4 packets would not be detected by the sender. Accordingly, the range used for NACK values may be appropriately configured based upon the application needs.

The NACK value is a serial number that indicates lost packet events. When a network peer receiver system detects some incoming packet did not arrive, it increases the NACK value. Each outgoing packet includes this NACK value. A sender observes NACK values reported from its peers, and when that value changes, the sender knows that the peer recently detected packet loss. Because only a change in NACK value implies a packet loss, the NACK messages themselves do not require a reliable transport. The system is able to tolerate lost NACK messages. This is contrasted with an acknowledgment-based scheme used by a reliable transport such as TCP in which any missing ACK message would require a retransmission by the sender, even if the packet containing the ACK contained no application data. Since there is no retransmission in the NACK-based scheme, it imposes less overhead during congestion than an ACK-based scheme.

The NACK bandwidth value indicates the inbound data rate on the network connection when the receiver system detected a packet loss event. In one embodiment, this value is highly quantized, and, for the sake of efficient use of a minimum number of bits for that field, assumes lower and upper limits to the data rate. Each application may configure those limits, but the limits are generally identical for all network peers.

Each packet may also have a timestamp, which is the wall clock time (or local clock of the sender system) of the sender, measured preferably in milliseconds. Upon receiving a data packet, receiver 204 is configured to store the most recently received timestamp value along with the receiver system's local wall clock time, also preferably in milliseconds.

When sending a data packet, sender 202 also sends an echo of the most recently received timestamp value from the peer, adjusted for retransmission delay. The echo value is the received value plus the time elapsed between receiving that timestamp and the time of sending a packet.

According to an embodiment of the present invention, the communication of data packets as described above may operate in "slow", "fast", or "hyperfast" modes. The "slow" mode may use the SQRT system ($a_I=1$; $a_D=-0.6$; $\kappa=-\frac{1}{2}$; $\lambda=\frac{1}{2}$) described in Bansal, D & Balakrishnan, H (2000): "TCP-friendly congestion control for real-time streaming applications", MIT Technical Report MIT-LCS-TR-806, May. The "fast" mode may use the AIMD system for ramping up the data rate. An analysis of an AIMD system is described in Chiu, D-M & Jain, R (1989): "Analysis of the increase and decrease algorithms for congestion avoidance in computer networks", Computer Networks and ISDN Systems, v. 17, pp. 1-14. The entire contents of the aforementioned Bansal & Balakrishnan and Chiu & Jain references are herein incorporated by reference for all purposes. The "hyperfast" may provide a special case wherein data rate is increased at twice the "fast" rate, but upon detection of the first packet loss, the system is forced into the "fast" mode. The modal operation allows the system to ramp up initially, then to operate with less fluctuation once the system approaches an equilibrium ABE value.

According to an embodiment of the present invention, the NACK data rate value is used as a floor for decreasing the ABE. This prevents the ABE from being decreased too far in an unusually lossy network. This failsafe protects against a number of conditions that would otherwise artificially cause BEM 110 to artificially reduce the ABE:

When receiving a NACK message, BEM 110 may compute the RTT (round trip time) by subtracting the timestamp echo from the current wall clock time.

Accordingly, RTT=(current wall clock)−(timestamp echo)

The value should always be positive so the smaller number is subtracted from the larger number. Each RTT measurement may get accumulated into a smoothing (low-pass) infinite impulse response filter, such as that described in Jacobson, V (1988): "Congestion avoidance and control", ACM Computer Communication Review; Proceedings of the Sigcomm '88 Symposium in Stanford, Calif., August, the entire contents of which are herein incorporated by reference for all purposes. BEM 110 may provide an API that an application may use for determining latency statistics, including mean and deviation.

In one embodiment, BEM 110 may be implemented as a Class comprising methods that may be called by application 108. For example, a GetAvailableBandwidthEstimate( ) method may be provided that take no parameters and returns an unsigned integer, which is the value of the ABE in bytes per second. The application may then communicate data packets at a data rate that is substantially equal to then the ABE value. Methods may also be provided for determining other information such latency information, and the like.

Packet Reordering and Loss Detection

As described above, a receiver sends a NACK message with a changed serial number or value to indicate a loss of data packet event. Because the routes that a packet takes from the sender to the receiver can vary, the data packets sent by an application from the sender can arrive at the receiver system in an order that is different from the order in which the packets were sent by the sender system. The receiver thus has to discriminate between reordered packet sequences and genuinely lost packets. In one embodiment, the receiver system is configured to look for non-contiguous packets and may tolerate some reordering (described below in more detail) before indicating a lost packet by sending a NACK with a changed serial number.

According to an embodiment of the present invention, the receiver maintains a non-contiguous sequence number buffer ("non-contiguous buffer") of elements representing sequence of data packets. The size of the buffer is user-configurable and determines the number of out-of-order packets that the receiver can handle without indicating a lost packet event. The first element in the buffer (or element with offset 0) corresponds to an expected data packet with the lowest sequence number that has not yet been received by the receiver.

Figure 4:
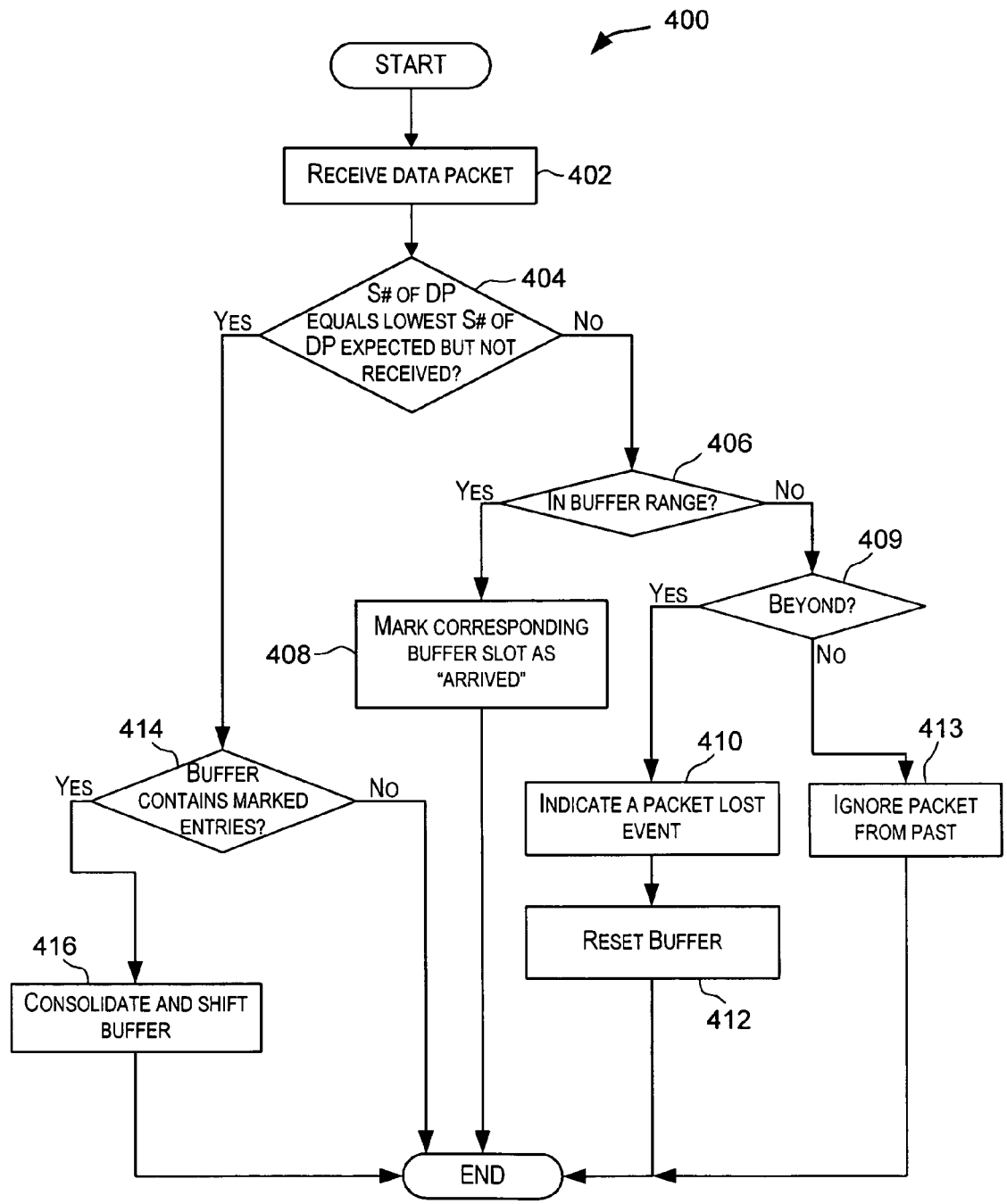
FIG. 4 depicts a simplified high-level flowchart for reordering and detecting lost packets according to an embodiment of the present invention.

FIG. 4 depicts a simplified high-level flowchart for reordering and detecting lost packets according to an embodiment of the present invention. The processing depicted in FIG. 4 may be performed by software (code modules or instructions) executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints.

As depicted in FIG. 4, processing is initiated upon a receiver system receives a data packet (step 402). A check is made to see if the sequence number of the arrived packet matches the lowest sequence number of an expected data packet that has not yet been received (step 404). If it is determined in 404 that the sequence number of the arrived packet does not match the lowest sequence number of an expected data packet that has not yet been received, then a check is made to see if the value of the arrived packet falls within a "buffer range" (step 406). The buffer range is the sequence number of a data packet corresponding to the first slot in the noncontiguous buffer plus the size of the noncontiguous buffer minus one. For example, if the next expected number is 2 and size of the noncontiguous reordering buffer is 4, then the buffer range is between 2 and 5. Accordingly, a data packet with sequence number 6 would be considered out of range.

Accordingly, if it is determined in step 406 that the sequence number is within the buffer range, then a slot in the non-contiguous buffer slot corresponding to the sequence number of the data packet is marked as "arrived" (step 408). If the sequence number of the arrived packet is not in the buffer range, then the sequence number may either be before the buffer range or beyond the buffer range. Accordingly, a check is made to determine if the sequence number is beyond the buffer range (step 409). If it is determined in 409 that the sequence number lies beyond the buffer range then a data packet loss event is indicated (step 410). This is done by sending a NACK message with a changed (e.g., incremented) NACK serial number or value. The noncontiguous buffer is then reset (step 412). If it is determined in 409 that the sequence number is less than the buffer range, it indicates a packet from the past, which has already been indicated as lost, has arrived and the packet is ignored (step 413).

If it is determined in 404 that the sequence number of the arrived packet matches the lowest sequence number of an expected data packet that has not yet been received then a check is made to determine if the noncontiguous buffer contains any marked slot entries (step 414). If it does, the entries in the buffer are left shifted until a "hole" (i.e., an unmarked slot entry) is encountered.

FIGS. 5 and 6 depict examples of how the techniques depicted in FIG. 4 and described above may be applied to detect packet loss and packet reordering. FIG. 5 depicts a scenario where a data packet with sequence number S0 arrives first (making S1 the next expected data packet with the lowest sequence number). A NACK with value N0 is sent by the receiver. The first element (offset 0) corresponds to packet S1. Instead, a packet with sequence number S2 is received next. Since S2 is in the buffer range (S1 to S4) (assuming a noncontiguous buffer length of 4), the slot of the noncontiguous buffer corresponding to packet S2 is marked as received (indicated by the shaded slot in FIG. 5). A NACK with value N0 is sent by the receiver (i.e., a loss of packet event is not indicated). Packet S3 arrives next and since S3 is in the buffer range (S1 to S4), the slot of the noncontiguous buffer corresponding to packet S3 is marked as received. A NACK with value N0 is sent by the receiver (i.e., a loss of packet event is not indicated). Packet S4 arrives next and since S4 is in the buffer range (S1 to S4), the slot of the noncontiguous buffer corresponding to packet S4 is marked as received. A NACK with value N0 is sent by the receiver (i.e., a loss of packet event is not indicated). Packet S5 arrives next. Since S5 is outside the buffer range, a data packet loss event is indicated by increasing the NACK value from N0 to N1 and communicating a NACK message with an incremented NACK value (N1). The non-contiguous buffer is reset. In this manner, the technique requires a number of additional data packets to arrive before it declares a packet missing. Also, no attempt is made to specifically identify which packet got dropped, since the system uses an unreliable protocol and does not attempt to retransmit dropped packets, only to detect and report them.

FIG. 6 depicts a scenario where multiple packets arrive out-of-order. Packet with sequence number S0 arrives first, thus making S1 the next expected sequence number. A NACK with value N0 is sent by the receiver. The first element (offset 0) corresponds to packet S1. Instead, a packet with sequence number S2 is received next. Since S2 is in the buffer range (S1 to S4), the slot of the noncontiguous buffer corresponding to packet S2 is marked as received. A NACK with value N0 is sent by the receiver (i.e., a loss of packet event is not indicated). Packet S4 arrives next and since S4 is in the buffer range (S1 to S4), the slot of the noncontiguous buffer corresponding to packet S4 is marked as received. A NACK with value N0 is sent by the receiver (i.e., a loss of packet event is not indicated). Packet S1 arrives next and since it is the next contiguous expected sequence number, the buffer is shifted left until a non-received sequence number, i.e., sequence S3 in encountered in the buffer. The buffer range is now from S3 to S6. A NACK with value N0 is sent by the receiver (i.e., a loss of packet event is not indicated). Packet S3 arrives next. Since S3 is the next expected sequence and the buffer contains no "holes", the buffer is reset. A NACK with value N0 is sent by the receiver (i.e., a loss of packet event is not indicated). In this manner, even though multiple data packets arrive out of order, the system is able to tolerate the out of ordering without indicating a loss of data packet event.

Controlling Latency

The techniques described above, enable senders to probe for and maximize the use of available bandwidth for data communications. However, as the ABE and is increased and an application sends data at rates per the ABE, the data rate at some point will oscillate about or over the maximum capacity of the network. As a result, buffers of routers in the communication path from the sender system to the receiver system will fill up. As a result, packets will start getting buffered and will have to wait in line for transmission behind other packets that have previously been buffered. The waiting packets will thus start to have a higher latency even before there is a loss of a data packet. Increased latency is generally a precursor to data packet loss. In practice, it has been seen that latency can change from under 10 milliseconds to well over 1000 milliseconds or even more. For an interactive online game, especially a racing game such as N05CFTC, latencies over 200 milliseconds make the game unplayable, because each peer must extrapolate remote out-of-date telemetry well past the prediction capabilities of dead reckoning methods. Accordingly, for such applications, techniques are needed for preventing latency from exceeding a certain level, without destroying the ability of the system to probe for additional available bandwidth and maximize bandwidth usage.

Embodiments of the present invention are accordingly configured to respond to high latencies in such a way that the data rate of the sender application is throttled back without ruining the application's ability to discover available bandwidth. Techniques are provided to keep latency low while optimizing bandwidth use.

According to an embodiment of the present invention, a latency-based trigger is used to throttle back bandwidth usage. A 2-mode (or 2-phase) cycle is used that alternates between a "STEADY" mode (or phase) and a "PROBING" mode (or phase). The PROBING mode involves probing for available bandwidth and using the maximum available bandwidth. This has the potential to fill network router packet buffers, thereby increasing latency. In the STEADY mode, less than the maximum available bandwidth is intentionally used (i.e., the application sending data rate is intentionally reduced to a fraction of the available bandwidth), which allows network router buffers to drain, thereby reducing latency. By alternating between the STEADY mode and the PROBING mode, a mechanism is provided for probing for available bandwidth and maximizing bandwidth usage while preventing latency from exceeding a certain level.

STEADY mode starts when the PROBING mode ends and PROBING mode begins when STEADY mode ends. Data communication may start with the PROBING mode followed by the STEADY mode or may alternatively start with STEADY mode followed by PROBING mode. In one embodiment, the data communication is started in the PROBING mode and remains in that mode until some trigger (e.g., detection of a packet loss event or detection of high latency) happens on at least one connection, at which point the system may begin to cycle between the two modes. This allows the system to more rapidly ramp up the ABE values toward their equilibria. The logic for the 2-mode alternating cycle may be implemented by the application sending the data and/or in BEM 110 or some other module in conjunction with the application and BEM 110.

Figure 7:
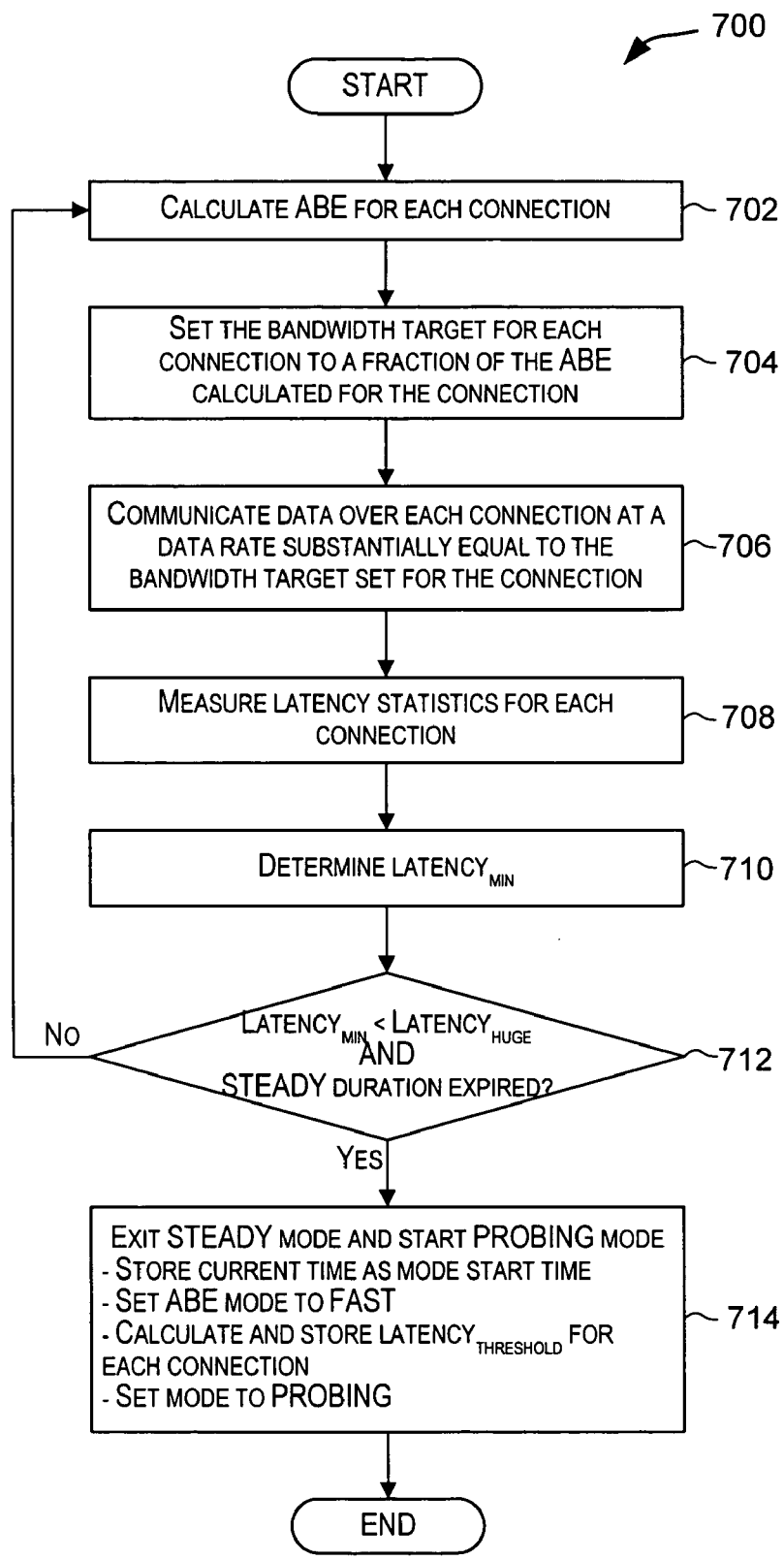
FIG. 7 depicts a simplified high-level flowchart depicting processing performed in STEADY mode according to an embodiment of the present invention.

FIG. 7 depicts a simplified high-level flowchart 700 depicting processing performed in STEADY mode according to an embodiment of the present invention. The processing depicted in FIG. 7 may be performed by software (code modules or instructions) executed by a processor, hardware modules, or combinations thereof. Flowchart 700 depicted in FIG. 7 is merely illustrative of an embodiment of the present invention and is not intended to limit the scope of the present invention. Other variations, modifications, and alternatives are also within the scope of the present invention. The method depicted in FIG. 7 may be adapted to work with different implementation constraints.

An application may communicate data to one or more clients or receivers over one or more network connections. The bandwidth capacity and characteristics of the networks connections may differ from one another. As depicted in FIG. 7, processing in the STEADY mode is initiated by calculating an available bandwidth estimate (ABE) for each network connection (step 702). Various different techniques described above may be used to find the ABE for each network connection. For example, the ABE value for each connection may be provided by BEM 110 based upon the characteristics of the network connection. Other techniques such as probes, data bursts, etc. may also be used by BEM 110 to determine the ABE for the connections.

A bandwidth target (bandwidth$_{target}$) for each network connection is then set to a fraction of the ABE calculated for that connection (step 704). In one embodiment, the bandwidth target for a connection is set as follows in STEADY mode $$\text{bandwidth}_{target} = \text{ABE} * \text{Fraction}_{STEADY}$$

where
ABE=ABE determined for the connection
Fraction$_{STEADY}$=a fraction having a value between 0 and 1

In this manner, for each connection, the target bandwidth at which an application is to send data over the connection during STEADY mode is intentionally reduced to a fraction of the ABE for the connection. The application is configured to communicate data at the target bandwidth data rate.

The fraction (Fraction$_{STEADY}$) that is used may use-configurable and may be set based upon the type of application and the speed of the connection. Preferably, the fraction should be small enough so that fluctuations in data rate do not fill router packet buffers and increase latency. In one implementation for the N05CFTC racing game, the fraction value of 0.6 was used based upon empirical analysis of the latencies associated with slow network connections. The same fraction may be used for all the connections or alternatively different fractions may be used for different connections.

Data is then communicated over the each network connection that is being used for the communications at a data rate that is substantially equal to the bandwidth target determined for the network connection in 704 (step 706). As previously described, in one embodiment, in STEADY mode, data communication operates in SLOW ABE mode, i.e., the data rate over each connection is controlled using the SQRT AIMD (additive increase, multiplicative decrease) control algorithm. One such algorithm is described in Bansal, D & Balakrishnan, H (2000): "TCP-friendly congestion control for real-time streaming applications", MIT Technical Report MIT-LCS-TR-806, May, is used ($a_I$=1; aD=−0.6; κ=−½; λ=½). The entire contents of this report are herein incorporated by reference for all purposes.

Latency statistics are measured for each network connection (step 708). The latency statistics may include determining a mean latency and a standard deviation for each connection. Latency values are measured ongoing for each connection (e.g., measured multiple times per second) over a time period. A mean latency value is determined for each connection and is the weighted average of those latency measurements. The mean latency for a connection is updated multiple times per second as the latency measurements are made. In one embodiment, the mean latency is identified as the latency associated with the network connection.

A minimum latency (latency$_{min}$) is determined from the latency values for the connections (step 710). The minimum latency is the lowest of the mean latency values calculated for the connections in step 708.

A check is then made to determine if a condition for exiting the STEADY mode and starting the PROBING mode is satisfied (step 712). The condition for exiting STEADY mode and starting PROBING mode may comprise one or more sub-conditions combined together (combined possibly using Boolean connectors). As depicted in FIG. 7, in one embodiment, the condition for exiting STEADY mode is satisfied if the value of latency$_{min}$ (determined in 710) is less than the value of a configurable latency value (latency$_{Huge}$) and the STEADY mode duration has expired (i.e., STEADY mode is exited if (latency$_{min}$<latency$_{Huge}$) AND (the STEADY mode duration has expired)). The value of latency$_{Huge}$ is typically based upon and set to the maximum latency that an application can tolerate (e.g., for a version of N05CFTC latency$_{Huge}$ was set to 200 milliseconds). Various other sub-conditions, combinations of sub-conditions, or even a single sub-condition (e.g., STEADY mode is exited when (latency$_{min}$<latency$_{Huge}$)) are possible in alternative embodiments of the present invention. If it is determined in step 712 that the condition is not satisfied, then processing continues with step 702.

The duration of the STEADY phase is preferably long enough so that the sender system can relax from stressing the network connection. Time is provided for the router packet buffers to have an opportunity to empty so that the latency associated with operating the network at (or above) full capacity diminishes. The STEADY phase should also not last too long, otherwise PROBING would happen too infrequently and the ABE would not have sufficient opportunity to increase and maximize bandwidth usage. In one implementation for the N05CFTC game, the STEADY mode duration was set to 20 seconds.

If it is determined in 712 that the condition for exiting STEADY mode is satisfied, then processing is performed to end STEADY mode and initiate PROBING mode (step 714). Several operations may be performed as part of step 714 according to an embodiment of the present invention. The current time (that may be determined from a local clock on the sender system) is stored as PROBING mode start time. The ABE mode is set to FAST (i.e., data rate is controlled using an AIMD model). A latency threshold value (latency$_{threshold}$) is calculated and stored for each network connection and the mode is then set to PROBING.

In one embodiment, the latency threshold (latency$_{threshold}$) value for each network connection is calculated based upon latency statistics determined in step 708 for the connection. According to an embodiment of the present invention, the latency$_{threshold}$ for each connection is calculated as follows:

$$\text{latency}_{threshold} = \text{Max}(\text{latency\_threshold}_{Min}, \text{Min}(\text{latency}_{mean} + K * \text{latency}_{deviation}, \text{latency}_{Huge}))$$

where latency_threshold$_{Min}$=a value that is set depending on the context of the application (typically, a negligible or very small latency value)

K=a constant latency$_{mean}$=mean latency value calculated for the connection latency$_{deviation}$=latency deviation calculated for the connection latency$_{Huge}$=a configurable value The latency_threshold$_{Min}$ parameter enables to mitigate the impact of latency. If latency is very low, then even a modest increase in latency has no adverse effect on a user's experience of the application. In one embodiment, latency_threshold$_{Min}$ is set to 50 milliseconds and K is set to 6. Latency$_{Huge}$ is typically based upon and set to the maximum latency that an application can tolerate. For example, for a game application latency$_{Huge}$ may be set to the maximum latency value that the game can tolerate—this value may be provided by the manufacturer of the game (e.g., 200 milliseconds for N05CFTC).

Figure 8:
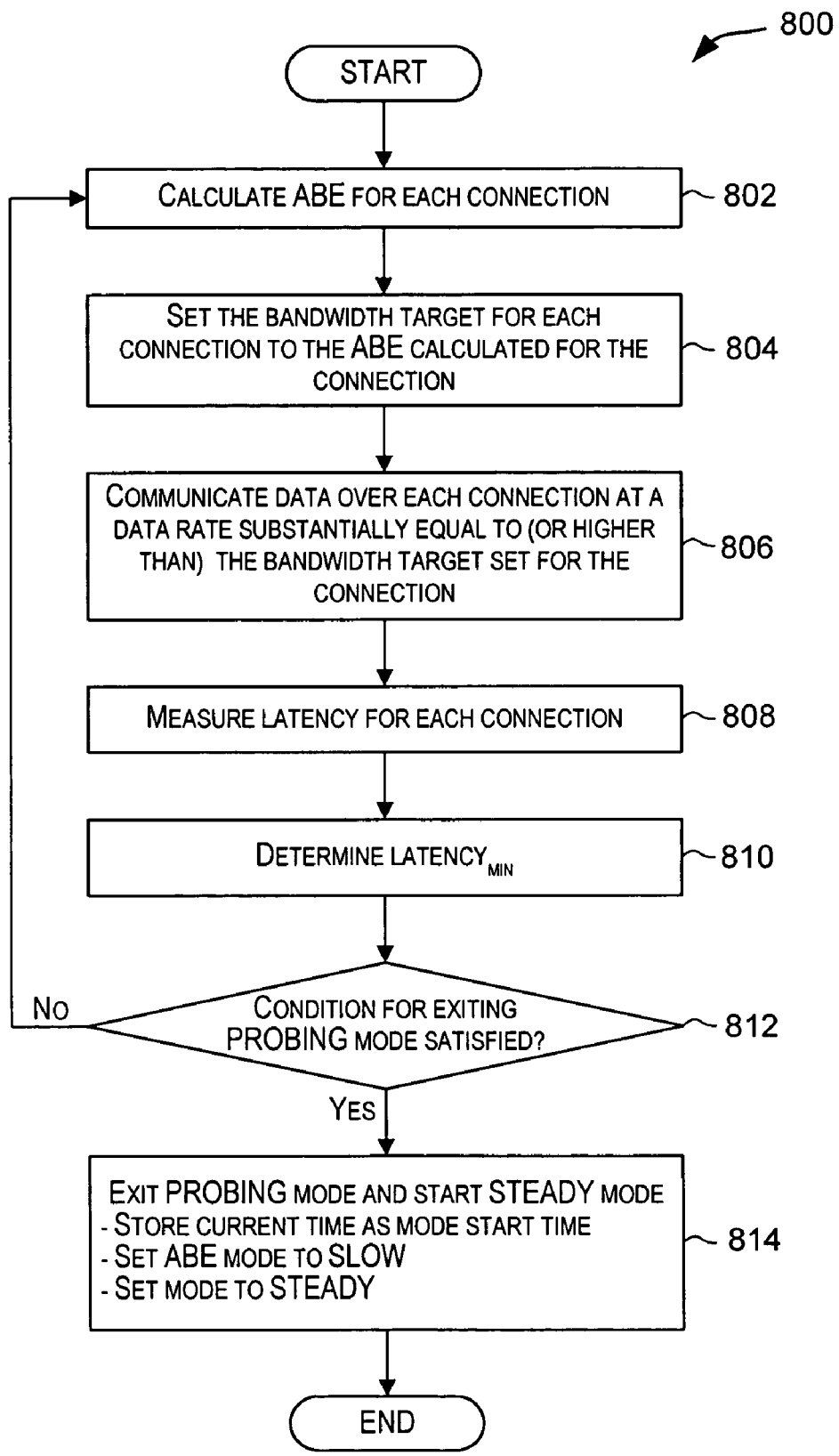
FIG. 8 depicts a simplified high-level flowchart depicting processing performed in PROBING mode according to an embodiment of the present invention.

PROBING mode starts when the STEADY mode ends. FIG. 8 depicts a simplified high-level flowchart 800 depicting processing performed in PROBING mode according to an embodiment of the present invention. The processing depicted in FIG. 8 may be performed by software (code modules or instructions) executed by a processor, hardware modules, or combinations thereof. Flowchart 800 depicted in FIG. 8 is merely illustrative of an embodiment of the present invention and is not intended to limit the scope of the present invention. Other variations, modifications, and alternatives are also within the scope of the present invention. The method depicted in FIG. 8 may be adapted to work with different implementation constraints.

As depicted in FIG. 8, processing is initiated by calculating an available bandwidth estimate (ABE) for each network connection (step 802). Various different techniques described above may be used to find the ABE for each network connection. For example, the ABE value for each connection may be provided by BEM 110 based upon the characteristics of the network connection. Other techniques such as probes, data bursts, etc. may also be used by BEM 110 to determine the ABE for the connections.

A bandwidth target (bandwidth$_{target}$) is then set for each connection to the ABE calculated for that connection in 802 (step 802). Data is then communicated over each network connection that is being used to communicate data at a data rate that is substantially equal to the bandwidth target determined for the network connection in 804 (step 806). As previously described, in one embodiment, in PROBING mode, data communication operates in "FAST" mode (classic AIMD model) wherein the ABE and the bandwidth target are ramped up or increased. An example of an AIMD model used by FAST mode is described in Chiu, D-M & Jain, R (1989): "Analysis of the increase and decrease algorithms for congestion avoidance in computer networks", Computer Networks and ISDN Systems, v. 17, pp. 1-14. The application is configured to communicate data at the target bandwidth data rate. Accordingly, the available bandwidth is probed and the data rate is increased to maximize use of the available bandwidth.

Latency values are measured for each network connection (step 808). In one embodiment, latency values are measured ongoing for each connection (e.g., measured multiple times per second) over a time period. Latency deviations may also be computed. A mean latency value is determined for each connection and is the weighted average of the latency measurements made for the connection. The mean latency for a connection is updated multiple times per second as the latency measurements are made. In one embodiment, the mean latency is identified as the latency associated with the network connection.

A minimum latency (latency$_{min}$) is determined from the latency values for the connections (step 810). The minimum latency is the lowest of the latency mean values determined in step 808.

A check is then made to see if the condition for exiting PROBING mode and starting the STEADY mode is satisfied (step 812). The condition for exiting PROBING mode and starting STEADY mode may comprise one or more sub-conditions combined together (combined possibly using Boolean connectors). In one embodiment, the condition for exiting PROBING mode is satisfied if:

(the value of latency$_{min}$ is greater than the value of latency$_{Huge}$) OR (for each connection, the latency determined for the connection is greater than a latency$_{threshold}$ value calculated for the connection at the end of the STEADY mode) OR (the PROBING mode duration has expired).

Accordingly, in one embodiment, PROBING mode is exited if:

U$_i$[latency$_i$>latency$_{threshold,i}$]) OR (latency$_{min}$>latency$_{Huge}$) OR (the PROBING mode duration has expired))
where
U$_i$[latency$_i$>latency$_{threshold,i}$] nomenclature means: for each connection, the latency determined for the connection is greater than a latency$_{threshold}$ value calculated for the connection.

Various other sub-conditions (or even a single sub-condition) and their combinations are possible in alternative embodiments of the present invention.

In general, the sender system monitors sudden and large changes in latency during the PROBING mode and uses the information to trigger termination of the PROBING phase and start of the STEADY phase. PROBING mode is terminated when, for each connection, the latency determined for the connection is greater than a latency threshold for the connection (a latency trigger threshold) or if the minimum latency is more than what the application can tolerate or when the time duration for the PROBING mode has expired.

The duration of the PROBING mode should preferably last long enough so that the communication system has time to react to the increase in bandwidth usage, which may depend on various factors such as how rapidly the application can throttle up its usage, how rapidly BEM 110 can respond, sender clock resolution, and others. In one implementation, the PROBING mode duration was set to 5 seconds. The PROBING phase should also preferably terminate soon enough so that if one or more network connection saturates, the associated latency increase should not endure too long. we chose to set that to 5 seconds.

If it is determined in step 812 that the condition is not satisfied, processing continues with step 802. If it is determined in 812 that the condition for exiting PROBING mode is satisfied, then processing is performed to terminate PROBING mode and initiate STEADY mode (step 814). Several operations may be performed as part of step 814 according to an embodiment of the present invention. The current time (that may be determined from a local clock on the sender system) is stored as STEADY mode start time. The ABE mode is set to SLOW (i.e., data rate is controlled using an SQRT AIMD model). The mode is then set to STEADY.

When simultaneously probing multiple connections for additional available bandwidth during the PROBING mode, the network connections can (and typically do) reach saturation (i.e., the date rate for communicating data on the connection is substantially equal to or above the available bandwidth for the connection) at different times. During the PROBING mode, the connections operating at saturation have to continue to operate at that level while the non-saturated connections continue to increase their bandwidth usage and probe for additional available bandwidth. This is because the sub-conditions for exiting the PROBING mode are that the value of latency$_{min}$ is greater than the value of latency$_{Huge}$ OR for each connection, the latency determined for the connection in step 806 is greater than a latency$_{threshold}$ value calculated for the connection at the end of the STEADY mode. This has the potential to increase latency on the saturated connections to levels that cannot be tolerated by the application. In order to mitigate this effect, according to an embodiment of the present invention, a latency-based penalty is applied to the connections so that they remain saturated but still cap their latency during PROBING mode.

Figure 9:
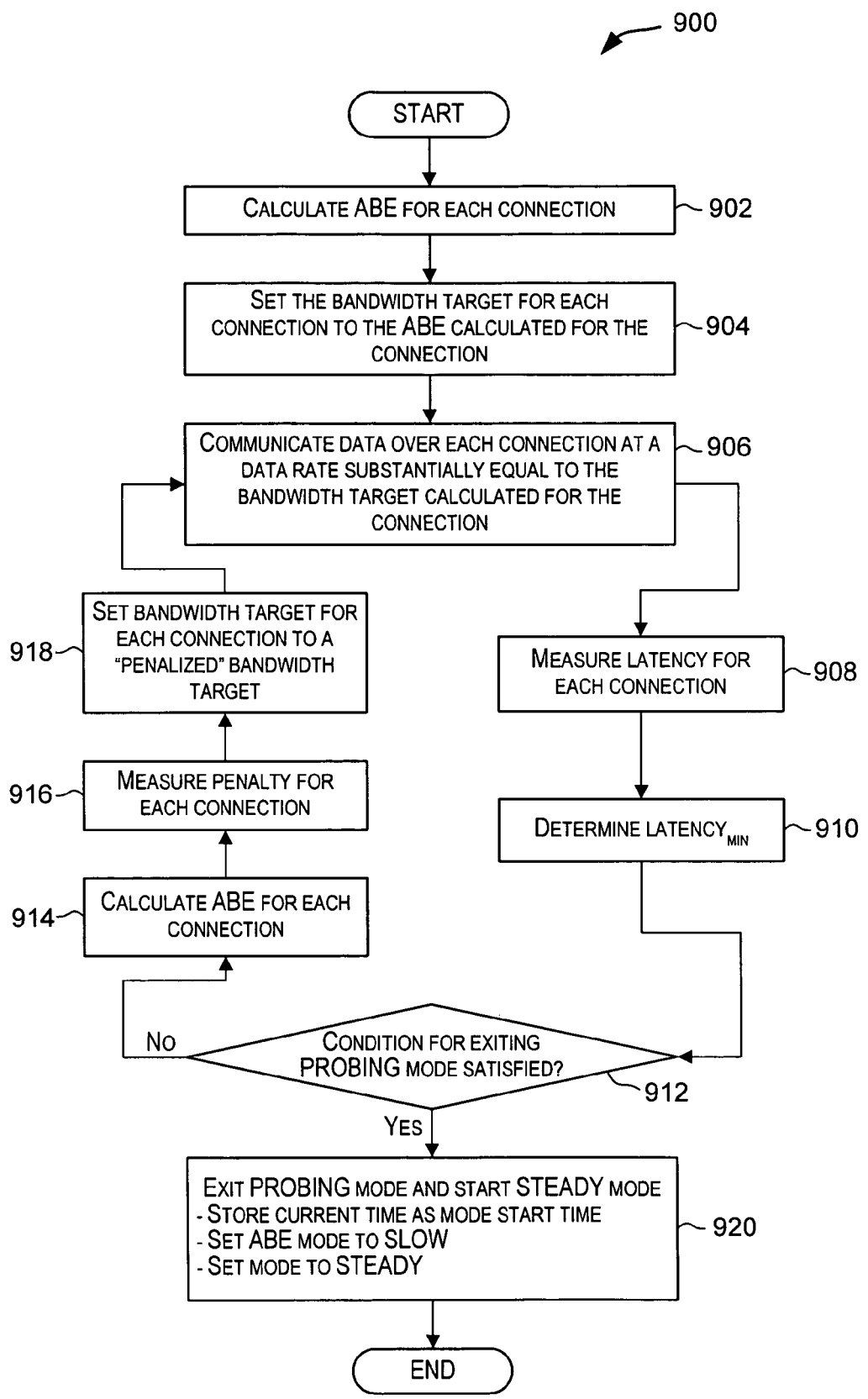
FIG. 9 depicts a simplified high-level flowchart 900 depicting processing performed in PROBING mode wherein a latency-based penalty is applied to connections according to an embodiment of the present invention.

FIG. 9 depicts a simplified high-level flowchart 900 depicting processing performed in PROBING mode wherein a latency-based penalty is applied to individual network connections according to an embodiment of the present invention. The processing depicted in FIG. 9 may be performed by software (code modules or instructions) executed by a processor, hardware modules, or combinations thereof. Flowchart 900 depicted in FIG. 9 is merely illustrative of an embodiment of the present invention and is not intended to limit the scope of the present invention. Other variations, modifications, and alternatives are also within the scope of the present invention. The method depicted in FIG. 9 may be adapted to work with different implementation constraints.

As depicted in FIG. 9, processing is initiated by calculating an available bandwidth estimate (ABE) for each network connection (step 902). Various different techniques described above may be used to find the ABE for each network connection. For example, the ABE value for each connection may be provided by BEM 110 based upon the characteristics of the network connection. Other techniques such as probes, data bursts, etc. may also be used by BEM 110 to determine the ABE for the connections.

A bandwidth target (bandwidth$_{target}$) is then set for each network connection to the ABE calculated for that connection (step 904). Data is then communicated over each network connection that is being used to communicate data at a data rate that is substantially equal to the bandwidth target determined for the network connection (step 906). Since during the initial pass through, the bandwidth target for each connection is set to the ABE determined for the connection, data is communicated at a data rate substantially equal to the ABE determined for the connection. As previously described, in PROBING mode, in one embodiment, data communication operates in "FAST" mode (classic AIMD model) wherein the ABE and the bandwidth target are gradually increased.

Latencies are measured for each network connection (step 908).). In one embodiment, latency values are measured ongoing for each connection (e.g., measured multiple times per second) over a time period. Latency deviations may also be computed. A mean latency value is determined for each connection and is the weighted average of the latency measurements made for the connection. The mean latency for a connection is updated multiple times per second as the latency measurements are made. In one embodiment, the mean latency is identified as the latency associated with the network connection.

A minimum latency (latency$_{min}$) is determined from the latency value determined for the connections (step 910). The minimum latency is the lowest of the latency mean values for the connections.

A check is then made to see if the condition for exiting the PROBING mode and starting the STEADY mode is satisfied (step 912). The condition for exiting PROBING mode and starting STEADY mode may comprise one or more sub-conditions combined together (combined possibly using Boolean connectors). In one embodiment, the condition is satisfied and PROBING mode is to be exited if:

(the value of latency$_{min}$ is greater than the value of latency$_{Huge}$ (typically set to the maximum latency that an application can tolerate)) OR (for each connection, the latency determined for the connection is greater than a latency$_{threshold}$ value calculated for the connection at the end of the STEADY mode) OR (the PROBING mode duration has expired).

Accordingly, in one embodiment, PROBING mode is exited if:

U$_i$[latency$_i$>latency$_{threshold,i}$]) OR (latency$_{min}$>latency$_{Huge}$) OR (the PROBING mode duration has expired))
where
U$_i$[latency$_i$>latency$_{threshold,i}$] nomenclature means: for each connection, the latency determined for the connection is greater than a latency$_{threshold}$ value calculated for the connection.

Various other sub-conditions (or even a single sub-condition) and their combinations are possible in alternative embodiments of the present invention. In general, the sender system monitors sudden and large changes in latency during the PROBING mode and uses the information to trigger termination of the PROBING phase and start of the STEADY phase.

If it is determined in step 912 that the condition is not satisfied, then the ABE is calculated for each network connection that is used for the data communication (step 914). A penalty value is then calculated for each network connection based upon the latency associated with the connection (step 916). In one embodiment, the "penalty" for each connection is calculated as follows:

penalty=Max(LowerClamp,Min(latency$_{Huge}$/latency, 1))

where
LowerClamp=User configurable lower bound for the penalty
latency$_{Huge}$=User-configurable value that is typically based upon and set to the maximum latency that an application generating the data being communicated can tolerate
latency=latency associated with the connection In one embodiment, LowerClamp is set to 0.25 and the penalty is accordingly clamped to lie in [0.25, 1].

The bandwidth target for each connection used for the data communication is then set to a "penalized" value based upon the ABE calculated for the connection (step 918). In one embodiment, the "penalized" bandwidth target for each connection is determined as follows:

bandwidth$_{target}$=ABE*penalty where
ABE=available bandwidth estimate determined for the connection
penalty=penalty determined for the connection In another embodiment, the bandwidth target for each connection may be determined based upon the amount of latency for that connection. For example, in one embodiment, three different regimes may be defined and the bandwidth target may be set differently for each regime based upon the value of the latency for a connection. A first regime (may be referred to as the "panic" regime) may be applicable when the latency associated with a connection is greater than some multiple of latency$_{Huge}$ (e.g., greater than (2*latency$_{Huge}$)), where latency$_{Huge}$ is based upon and set to the maximum latency that an application can tolerate. If a connection from the multiple connections used for the data communication is determined to be in this first "panic" regime, then the bandwidth target for the connection may be set as follows:

bandwidth$_{target}$=ABE*fraction$_{STEADY}$*penalty where
ABE=ABE calculated for the connection
fraction$_{STEADY}$=a fraction between 0 and 1 (set to 0.6 in one embodiment)
penalty=penalty calculated for the connection The first "panic" regime is typically rarely encountered and only briefly, e.g., on very low-bandwidth connections during unexpected bandwidth spikes. The effect of the penalized bandwidth target is to effectively return that individual connection to a much lower bandwidth target, effectively terminating probing for that connection. This has the potential to break the fairness of the algorithm, but we prioritize low latencies to true fairness.

A second regime (may be referred to as the "saturated" regime) may be applicable when the latency associated with a connection is greater than the latency$_{threshold}$ calculated for the connection. If a connection is determined to be in this second "saturated" regime, then the bandwidth target for the connection may be set as follows:

bandwidth$_{target}$=ABE*fraction$_{saturated}$*penalty where
ABE=ABE calculated for the connection
fraction$_{saturated}$=(1+fraction$_{STEADY}$)/2
where fraction$_{STEADY}$ is a fraction between 0 and 1 (set to 0.6 in one embodiment)
penalty=penalty calculated for the connection The second "saturated" regime allows the system to continue to probe unsaturated connections while not increasing the bandwidth target for saturated connections. The bandwidth target in this regime is in principle the maximum that the connection will allow. The fraction$_{saturated}$ modifier is a tunable parameter that allows users to tweak the response of the system to artificially drive the bandwidth target below the measured ABE, so make the latency reduction happen faster.

A third regime (may be referred to as the "unsaturated" regime) may be applicable to connections that do not fall in the first or second regimes. In this regime, the bandwidth target for the connection may be set as follows:
bandwidth$_{target}$=ABE
where ABE=ABE calculated for the connection The third "unsaturated" regime is the simplest: it means that latency is below a value that indicates the connection is saturated (i.e., the connection shows no sign of strain), and the system can proceed to probe for additional bandwidth. This behavior regime is essentially how a normal rate-based control system would operate in the absence of latency mitigation operations.

Accordingly, as described above, in a three regime system according to an embodiment of the present invention:
if (latency>2*latency$_{Huge}$) then
bandwidth$_{target}$=ABE*fraction$_{STEADY}$*penalty
else if (latency>latency$_{threshold}$) then
bandwidth$_{target}$=ABE*fraction$_{saturated}$*penalty
else
bandwidth$_{target}$=ABE In one embodiment, the target bandwidth that is calculated may also be clamped to lie in [bandwidth$_{min}$, bandwidth$_{max}$]. The bandwidth$_{min}$ and bandwidth$_{max}$ parameters may be user-configurable. The application is configured to transmit data over each connection at a data rate that is substantially equal to the bandwidth$_{target}$ calculated for the connection.

Processing then continues with step 906 wherein data is communicated over each network connection that is being used to communicate data at a data rate that is substantially equal to the bandwidth target determined for the network connection. Since the bandwidth target for a network connection may be a penalized bandwidth target, the data is communicated at that penalized bandwidth target rate.

If it is determined in 912 that the condition for exiting PROBING mode is satisfied, then processing is performed to terminate PROBING mode and initiate STEADY mode (step 920). Several operations may be performed as part of step 920 according to an embodiment of the present invention. The current time (that may be determined from a local clock on the sender system) is stored as STEADY mode start time. The ABE mode is set to SLOW (i.e., data rate is controlled using an SQRT AIMD model). The mode is then set to STEADY.

The rationale for using a penalized bandwidth target is as follows. It is assumed that then the actual data rate meets or exceeds available capacity, intermediate router buffers begin to fill, thus increasing latency, so a latency-based data rate reduction should allow those buffers to drain, and allow latency to diminish. Further, for interactive applications such as online video games, high latency values are undesirable regardless of whether they correlate to saturation, so as long as latency correlates to actual data rate for any reason (saturation or otherwise) then reducing data rate should reduce latency. In practice, the penalty-based rate correction may cause the data rate to fluctuate because packet buffer filling, and the associated increase in latency, lags behind an increase in data rate, and vice versa. This fluctuation provides a benefit over a constant penalty in that saturated connections continue to consume intermittently the maximum available bandwidth, and therefore other connections to the same host do not unfairly gain the unused bandwidth fraction.

Figure 10:
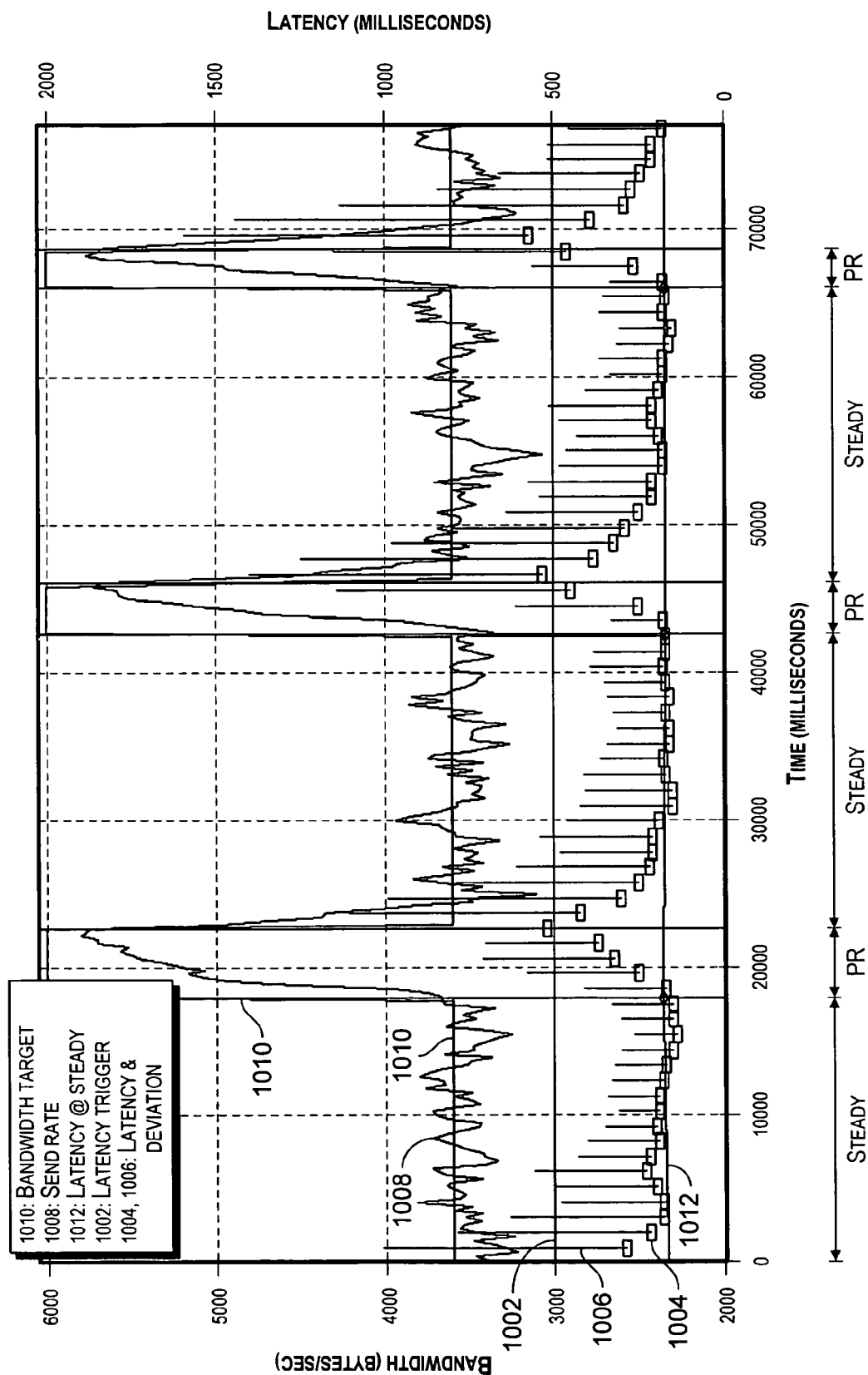
FIG. 10 depicts a simplified graph depicting the effects of an alternating STEADY and PROBING mode cycle according to an embodiment of the present invention for a network connection having a capacity of 64 kbps.

FIG. 10 depicts a simplified graph depicting the effects of an alternating STEADY and PROBING mode cycle according to an embodiment of the present invention for a network connection having a capacity of 64 kbps. The STEADY and PROBING modes are identified. Line 1002 represents the latency trigger threshold calculated for a connection during a STEADY mode that is used to determine when the next PROBING mode terminates. Line 1010 represents the bandwidth target for the connection. The data rate of the application is represented by line 1008. As can be seen, the application attempts to communicate data at a data rate that is substantially equal (fluctuates around the bandwidth target) to the bandwidth target. Boxes 1004 represent the latency associated with data communication using the connection. The lines 1006 above the boxes indicate the latency deviation. Line 1012 represents the latency level in steady state.

As can be seen from FIG. 10, latency increases when the PROBING phase starts, and that phase terminates when the latency (indicated by the box markers 1004) exceeds the trigger value (line 1002), captured at the end of the preceding STEADY phase. PROBING mode terminates when latency exceeds the latency trigger value. The latency values are lowered in STEADY mode.

In the embodiment depicted in FIG. 10, the trigger value (line 1002) is the value of latency plus six times the deviation at the moment PROBING begins. Although, latency trigger threshold (indicated by line 1002) appears to be a constant in the embodiment depicted in FIG. 10, it should be understood that the latency threshold is calculated during a STEADY mode for a connection may change with each STEADY/PROBING cycle. For example, as previously described, the latency threshold is determined as follows:

$$\text{latency}_{threshold} = \text{Max}(\text{latency\_threshold}_{Min}, \text{Min}(\text{latency}_{mean} + K*\text{latency}_{deviation}, \text{latency}_{Huge}))$$

where
- latency_threshold$_{Min}$=a value that is set depending on the context of the application (typically, a negligible or very small latency value)
- K=a constant
- latency$_{mean}$=mean latency value calculated for the connection
- latency$_{deviation}$=latency deviation calculated for the connection
- latency$_{Huge}$=a configurable value need not be constant in alternative embodiments. Also note that in FIG. 10 the duration of the PROBING phase shortens with each cycle.

As described above, techniques are provided for providing a target send rate, and the application provides data at the specified rate. Techniques are also described for implementing a latency-based throttle which works for interactive online gaming purposes and other application.

According to an embodiment of the present invention, the sender uses a round-robin data distribution scheme to send data to multiple receivers. According to this scheme, during each communication burst (which generally occurs on a quantized interval), the data communication starts with a different client each time. This eliminates accidental favoritism which may occur if the network sends data batches always starting with the same receiver.

Figure 11:
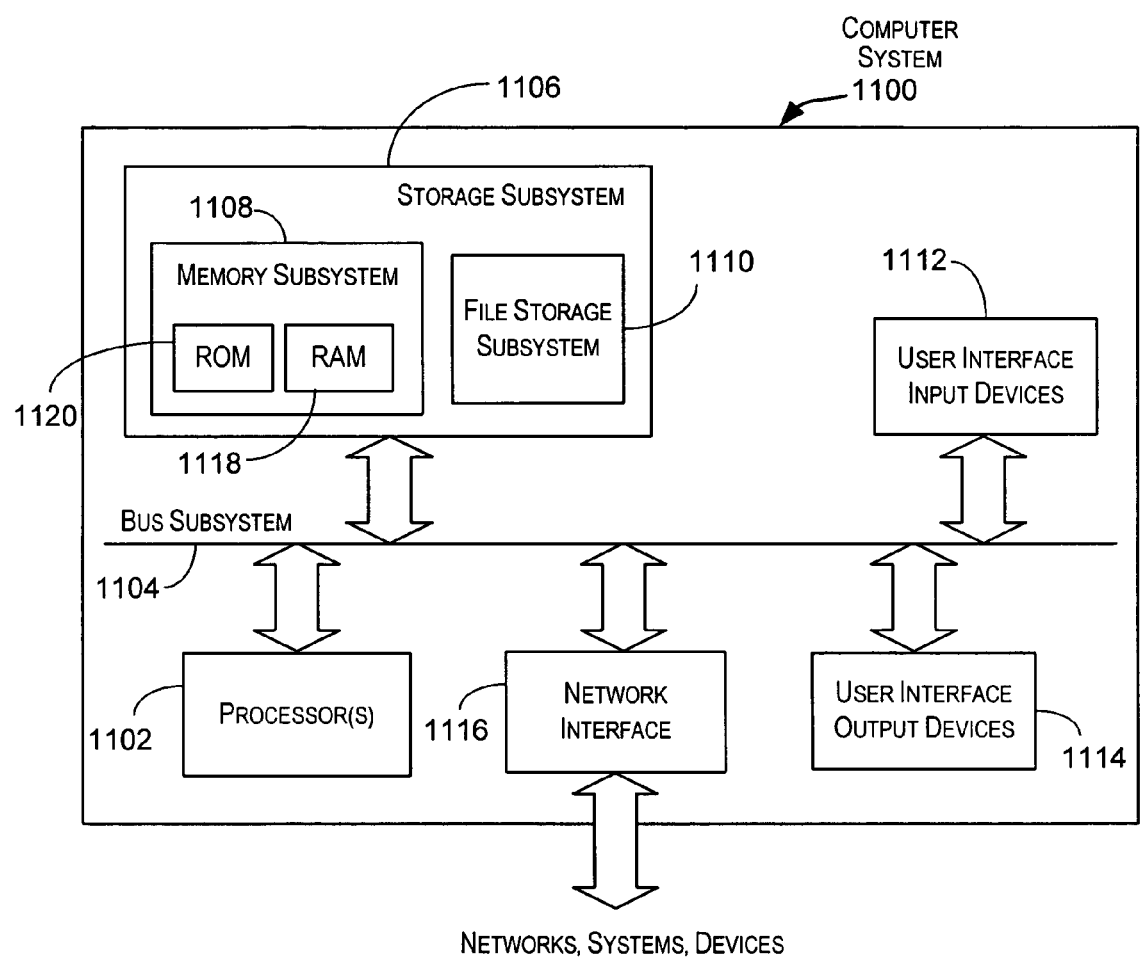
FIG. 11 is a simplified block diagram of a computer system that may be used to practice an embodiment of the present invention.

FIG. 11 is a simplified block diagram of a computer system 1100 that may be used to practice an embodiment of the present invention. As shown in FIG. 11, computer system 1100 includes a processor 1102 that communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, networks, and devices. Network interface subsystem 1116 serves as an interface for receiving data from and transmitting data to other systems from computer system 1100.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 may be configured to store the basic programming and data constructs that provide the functionality of the present invention. Software (code modules or instructions) that provides the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1100 can be of various types including a personal computer, a portable computer, a workstation, a network computer, a mainframe, a kiosk, or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

BIBLIOGRAPHY (1) Postel, J. (1980): "RFC 768: User Datagram Protocol", Internet Engineering Task Force, August 28.
(2) Postel, J. (1981): "RFC 793: Transmission Control Protocol", Internet Engineering Task Force, September.
(3) Jacobson, V (1988): "Congestion avoidance and control", ACM Computer Communication Review; Proceedings of the Sigcomm '88 Symposium in Stanford, Calif., August.
(4) Chiu, D-M & Jain, R (1989): "Analysis of the increase and decrease algorithms for congestion avoidance in computer networks", Computer Networks and ISDN Systems, v. 17, pp. 1-14.
(5) Floyd, S & Jacobsen, V (1993): "Random early detection gateways for congestion avoidance", IEEE/ACM Transactions on Networking, August.
(6) Taylor, D & Morrison, J (1995): "A DIS Variant for Reducing Latency in Long-Haul Networks Final Report", MaK Technologies, Cambridge, Mass.
(7) Gaynor, M (1996): "Proactive packet dropping methods for TCP gateways", November 11.
(8) Padhye, J, Kurose, J, Towsley, D & Koodli, R (1998): "A TCP-friendly rate adjustment protocol for continuous media flows over best effort networks", Technical Report 98 11, UMASS CMPSCI.
(9) Braden, et al. (1998): "RFC 2309: Recommendations on queue management and congestion avoidance in the internet", Internet Engineering Task Force.
(10) Sisalem, D & Schulzrinne, H (1998): "The loss-delay based adjustment algorithm: a TCP-friendly adaptation scheme", German Ministry of Education and Research.
(11) Floyd, S & Fall, K (1999): "Promoting the use of end-to-end congestion control in the internet", IEEE/ACM Transactions on Networking, May.
(12) Bansal, D & Balakrishnan, H (2000): "TCP-friendly congestion control for real-time streaming applications", MIT Technical Report MIT-LCS-TR-806, May.
(13) Z. B. Simpson (2000): "A stream-based time synchronization technique for networked computer games," http://www.mine-control.com/zack/timesync/timesync.html.
(14) Balakrishnan, H & Seshan, S (2001): "RFC 3124: The congestion manager", Internet Engineering Task Force, June.
(15) Liu, J, Li, B, Zhang, Y-Q (2001): "An end-to-end adaptation protocol for layered video multicast using optimal rate allocation".
(16) Aboobaker, N, Chanady, D & Gerla, M. (2002): "Streaming media congestion control using bandwidth estimation".
(17) Cho, S, Woo, H, Lee, J-w (2002): "ATFRC: Adaptive TCP friendly rate control protocol", Korean Ministry of Education.
(18) Jun Yi Lee (2003): "Performance analysis of binomial rate adaptation scheme for TCP-friendly congestion control", student thesis, Department of Computer Science and Information Engineering, National Chung Cheng University, Chia-Yi, Taiwan, Republic of China.
(19) Gourlay, M (2003a): "Dead Reckoning with Targeting in NASCAR", EA Knowledge, http://www.worldwide.ea.com/core/view.aspx?id=917, November.
(20) Gourlay, M (2003b): "Online pack racing: NASCAR Thunder for PS2", EA Knowledge, http://www.worldwide.ea.com/core/view.aspx?id=916, November.
(21) Biaz, S & Vaidya, N H (2003): "Is the round-trip time correlated with the number of packets in flight?", IMC '03, Miami Beach, Fla., USA, ACM, October 27-29.

What is claimed is:

1. A method of communicating data from a sender system to a receiver system via a network connection, the method comprising:
 communicating data from the sender system to the receiver system in a first mode over the network connection, wherein communicating the data in the first mode comprises:
 (a) determining an available bandwidth estimate for the network connection;

(b) determining a bandwidth target that is a fraction of the available bandwidth estimate, such that the bandwidth target is less than the available bandwidth estimate;

(c) communicating data from the sender system via the network connection using an unreliable protocol at a data rate that is substantially equal to the bandwidth target;

(d) monitoring latency associated with the network connection;

repeating (a), (b), (c), and (d) until a condition for exiting the first mode is satisfied; and exiting the first mode upon determining that the condition for exiting the first mode is satisfied;

computing a latency threshold ($latency_{threshold}$) for the network connection, wherein the latency threshold computed for the network is computed as is set to a greater of (a) a minimum latency threshold value; and (b) the smaller of the latency associated with the network connection plus a constant times a latency deviation value and a first latency value;

communicating data from the sender system to the receiver system in a second mode over the network connection, wherein communicating the data in the second mode comprises:

(e) determining an available bandwidth estimate for the network connection;

(f) determining a bandwidth target that is substantially equal to the available bandwidth estimate;

(g) communicating data from the sender system via the network connection using an unreliable protocol at a data rate that is substantially equal to or greater than the bandwidth target;

(h) monitoring latency associated with the network connection;

repeating (e), (f), (g), and (h) until a condition for exiting the second mode is satisfied; and exiting the second mode upon determining that the condition for exiting the second mode is satisfied; and alternating between the first mode and the second mode over the network connection.

2. The method of claim 1 wherein:

the data that is communicated is generated by an online game application hosted by the sender system; and the receiver system is a data processing system receiving data from the online game application.

3. The method of claim 1 wherein the unreliable protocol used for communicating data in the first mode and in the second mode is User Datagram Protocol (UDP).

4. The method of claim 1 wherein the condition for exiting the first mode is satisfied when the latency associated with the network connection is less than a first latency value, wherein the first latency value is based upon a latency tolerance of an application generating the data being communicated.

5. The method of claim 1 wherein the condition for exiting the first mode is satisfied when the latency associated with the network connection is less than a first latency value and a time duration for the first mode has expired, wherein the first latency value is based upon a latency tolerance of an application generating the data being communicated.

6. The method of claim 1 wherein the condition for exiting the second mode is satisfied when the latency associated with the network connection is greater than the latency threshold ($latency_{threshold}$) computed for the network connection during the first mode or a time duration for the second mode has expired.

7. The method of claim 1 wherein the available bandwidth estimate for the network connection is increased during the second mode upon determining that data packet loss has not occurred.

8. A method of communicating data from a sender system via a plurality of network connections using an unreliable protocol, the method comprising:

communicating data from the sender system over the plurality of connections in a first mode, wherein communicating the data in the first mode comprises:

(a) determining an available bandwidth estimate for each network connection in the plurality of network connections;

(b) determining, for each network connection in the plurality of network connections, a bandwidth target that is a fraction of the available bandwidth estimate for the network connection, such that the bandwidth target is less than the available bandwidth estimate;

(c) communicating, for each network connection in the plurality of network connections, data via the network connection using an unreliable protocol at a data rate that is substantially equal to the bandwidth target determined for the network connection;

(d) monitoring latency associated with the plurality of network connections;

repeating (a), (b), (c), and (d) until a condition for exiting the first mode is satisfied; and exiting the first mode upon determining that the condition for exiting the first mode is satisfied;

computing a latency threshold ($latency_{threshold}$) for each network connection in the plurality of network connections, wherein the latency threshold is computed as is set to a greater of (a) a minimum latency threshold value; and (b) the smaller of the latency associated with the network connection plus a constant times a latency deviation value and a first latency value;

communicating data from the sender system over a first network connection of the plurality of network connections in a second mode, wherein communicating the data in the second mode comprises:

(e) determining an available bandwidth estimate for each network connection in the plurality of network connections;

(f) determining a penalty for the first network connection;

(g) determining a bandwidth target for the first network connection based upon the available bandwidth estimate and the penalty determined for the first network connection;

(h) communicating data via the first network connection using an unreliable protocol at a data rate that is substantially equal to or greater than the bandwidth target determined for the first network connection;

(i) monitoring latency associated with the first network connection;

repeating (e), (f), (g), (h), and (i) until a condition for exiting the second mode is satisfied; and exiting the second mode upon determining that a condition for exiting the second mode is satisfied; and alternating between the first mode and the second mode over the first network connection.

9. The method of claim 8 wherein the penalty is determined based upon a latency tolerance of an application generating the data being communicated, and the latency associated with the first network connection.

10. The method of claim 8 wherein determining a bandwidth target for the first network connection in the second mode comprises:
  if the latency associated with the network connection is greater than a first latency, then setting the bandwidth target based upon the available bandwidth estimate determined for the network connection in the second mode, a first constant, and the penalty determined for the network connection, wherein the first latency value is based upon a latency tolerance of an application generating the data being communicated.

11. The method of claim 10 wherein determining a bandwidth target for the first network connection in the second mode further comprises:
  if the latency associated with the first network connection is greater than the latency threshold computed for the first network connection during the first mode, then setting the bandwidth target for the first network connection based upon the available bandwidth estimate determined for the first network connection in the second mode, a second constant, and the penalty determined for the first network connection, where the second constant is calculated based upon the first constant.

12. The method of claim 11 wherein determining a bandwidth target for the first network connection in the second mode further comprises:
  if the latency associated with the first network connection is less than or equal to the latency threshold computed for the first network connection during the first mode, then setting the bandwidth target for the first network connection to the available bandwidth estimate determined for the first network connection in the second mode.

13. The method of claim 8 wherein the condition for exiting the first mode is satisfied when, in the first mode, the latency associated with a network connection from the plurality of network connections having the lowest associated latency is less than a first threshold latency value, the first threshold latency value determined based upon a latency tolerance of an application generating the data being communicated.

14. The method of claim 8 wherein the condition for exiting the first mode is satisfied when, in the first mode, the latency associated with a network connection from the plurality of network connections having the lowest associated latency is less than a first threshold latency value and a time duration for the first mode has expired, the first threshold latency value determined based upon a latency tolerance of an application generating the data being communicated.

15. The method of claim 8 further comprising:
  wherein the condition for exiting the second mode is satisfied when, in the second mode,
  the latency associated with the network connection in the second mode is greater than a first threshold latency value, or
  a time duration for the first mode has expired, or
  the latency associated with each network connection in the plurality of network connections is greater than the latency threshold (latency$_{threshold}$) computed for the network connection during the first mode.

16. The method of claim 8 wherein the unreliable protocol used for communicating data in the first mode and in the second mode is User Datagram Protocol (UDP).

17. The method of claim 8 wherein:
  the data that is communicated is generated by an online game application hosted by the sender system; and
  the receiver system is a data processing system receiving data from the online game application.

18. A system for communicating data to a receiver system using a network connection, the system comprising:
  a processor;
  a memory coupled to the processor, the memory configured to store a set of instructions which when executed by the processor cause the processor to:
    communicate data to the receiver system in a first mode over the network connection, wherein communicating the data in the first mode comprises:
      (a) determining an available bandwidth estimate for the network connection;
      (b) determining a bandwidth target that is a fraction of the available bandwidth estimate, such that the bandwidth target is less than the available bandwidth estimate;
      (c) communicating data to the receiver system via the network connection using an unreliable protocol at a data rate that is substantially equal to the bandwidth target;
      (d) monitoring latency associated with the network connection;
    repeating (a), (b), (c), and (d) until a condition for exiting the first mode is satisfied; and
    exiting the first mode upon determining that the condition for exiting the first mode is satisfied;
  computing a latency threshold (latency$_{threshold}$) for the network connection, wherein the latency threshold computed for the network is set to a greater of value of (a) a minimum latency threshold value; and (b) the smaller of the latency associated with the network connection plus a constant times a latency deviation value and a first latency value;
  communicate data to the receiver system in a second mode over the network connection, wherein communicating the data in the second mode comprises:
    (e) determining an available bandwidth estimate for the network connection;
    (f) determining a bandwidth target that is substantially equal to the available bandwidth estimate;
    (g) communicating data to the receiver system via the network connection using an unreliable protocol at a data rate that is substantially equal to or greater than the bandwidth target;
    (h) monitoring latency associated with the network connection;
    repeating (e), (f), (g), and (h) until a condition for exiting the second mode is satisfied; and
    exiting the second mode upon determining that the condition for exiting the second mode is satisfied; and
  alternate between the first mode and the second mode over the network connection.

19. The system of claim 18 wherein:
  the data that is communicates is generated by an online gaming application hosted by the system; and
  the receiver system is a data processing system receiving data from the online gaming application.

20. The system of claim 18 wherein the unreliable protocol used for communicating data in the first mode and in the second mode is User Datagram Protocol (UDP).

21. The system of claim 18 wherein the condition for exiting the first mode is satisfied when the latency associated with the network connection is less than a first latency value, wherein the first latency value is set based upon a latency tolerance of an application generating the data being communicated.

22. The system of claim 18 wherein the condition for exiting the first mode is satisfied when the latency associated with the network connection is less than a first latency value and a time duration for the first mode has expired, wherein the first latency value is set based upon a latency tolerance of an application generating the data being communicated.

23. The system of claim 18 wherein the condition for exiting the second mode is satisfied when the latency associated with the network connection is greater than the latency threshold ($latency_{threshold}$) computed for the network connection during the first mode or a time duration for the second mode has expired.

24. The system of claim 18 wherein the available bandwidth estimate for the network connection is increased during the second mode.

25. A system for communicating data using a plurality of network connections, the system comprising:
   a processor; and
   a memory coupled to the processor, the memory configured to store a set of instructions which when executed by the processor cause the processor to:
   communicate data over the plurality of connections in a first mode, wherein communicating the data in the first mode comprises:
   (a) determining an available bandwidth estimate for each network connection in the plurality of network connections;
   (b) determining, for each network connection in the plurality of network connections, a bandwidth target that is a fraction of the available bandwidth estimate for the network connection, such that the bandwidth target is less than the available bandwidth estimate;
   (c) communicating, for each network connection in the plurality of network connections, data via the network connection using an unreliable protocol at a data rate that is substantially equal to the bandwidth target determined for the network connection;
   (d) monitoring latency associated with the plurality of network connections;
   repeating (a), (b), (c), and (d) until a condition for exiting the first mode is satisfied; and
   exiting the first mode upon determining that the condition for exiting the first mode is satisfied;
   computing a latency threshold ($latency_{threshold}$) for each network connection in the plurality of network connections, wherein the latency threshold computed for the network connection is set to a greater of value of (a) a minimum latency threshold value; and (b) the smaller of the latency associated with the network connection plus a constant times a latency deviation value and a first latency value;
   communicating data over a first network connection of the plurality of network connections in a second mode, wherein communicating the data in the second mode comprises:
   (e) determining an available bandwidth estimate for each network connection in the plurality of network connections;
   (f) determining a penalty for the first network connection;
   (g) determining a bandwidth target for the first network connection based upon the available bandwidth estimate and the penalty determined for the first network connection;
   (h) communicating data via the first network connection using an unreliable protocol at a data rate that is substantially equal to or greater than the bandwidth target determined for the first network connection;
   (i) monitoring latency associated with the first network connection;
   repeating (e), (f), (g), (h), and (i) until a condition for exiting the second mode is satisfied; and
   exiting the second mode upon determining that a condition for exiting the second mode is satisfied; and
   alternating between the first mode and the second mode over the first network connection.

26. The system of claim 25 wherein the penalty is determined based upon a latency tolerance of an application generating the data that is communicated and the latency associated with the first network connection.

27. The system of claim 25 wherein determining a bandwidth target for the first network connection in the second mode comprises:
   if the latency associated with the network connection is greater than a first latency, then setting the bandwidth target based upon the available bandwidth estimate determined for the first network connection in the second mode, a first constant, and the penalty determined for the first connection, wherein the first latency value is based upon a latency tolerance of an application generating the data that is communicated;
   if the latency associated with the first network connection is greater than the latency threshold computed for the first network connection during the first mode, then setting the bandwidth target for the first network connection based upon the available bandwidth estimate determined for the first network connection in the second mode, a second constant, and the penalty determined for the first network connection, where the second constant is calculated based upon the first constant; and
   if the latency associated with the first network connection is less than or equal to the latency threshold computed for the first network connection during the first mode, then setting the bandwidth target for the first network connection to the available bandwidth estimate determined for the first network connection in the second mode.

28. The system of claim 25 wherein the condition for exiting the first mode is satisfied when, in the first mode, the latency associated with a network connection from the plurality of network connections having the lowest associated latency is less than a first threshold latency value, the first threshold latency value determined based upon a latency tolerance of an application generating the data that is communicated.

29. The system of claim 25 wherein the condition for exiting the first mode is satisfied when, in the first mode, the latency associated with a network connection from the plurality of network connections having the lowest associated latency is less than a first threshold latency value and a time duration for the first mode has expired, the first threshold latency value determined based upon a latency tolerance of the application generating the data that is communicated.

30. The system of claim 25:
   wherein the condition for exiting the second mode is satisfied when, in the second mode,
   the latency associated with the network connection in the second mode is greater than a first threshold latency value, or
   a time duration for the first mode has expired, or
   the latency associated with each network connection in the plurality of network connections is greater than the latency threshold ($latency_{threshold}$) computed for the network connection during the first mode.

31. The system of claim 25 wherein the unreliable protocol used for communicating data in the first mode and in the second mode is User Datagram Protocol (UDP).

* * * * *